May 15, 1951  K. H. CHAPPLE ET AL  2,553,526
MAXIMUM AVAILABLE MANIFOLD PRESSURE AND
BRAKE HORSEPOWER COMPUTER
Filed Sept. 12, 1947  8 Sheets-Sheet 1

KENNETH H. CHAPPLE
RAYMOND E. KITTREDGE
*INVENTORS*

BY Donald T. Hillier

ATTORNEY

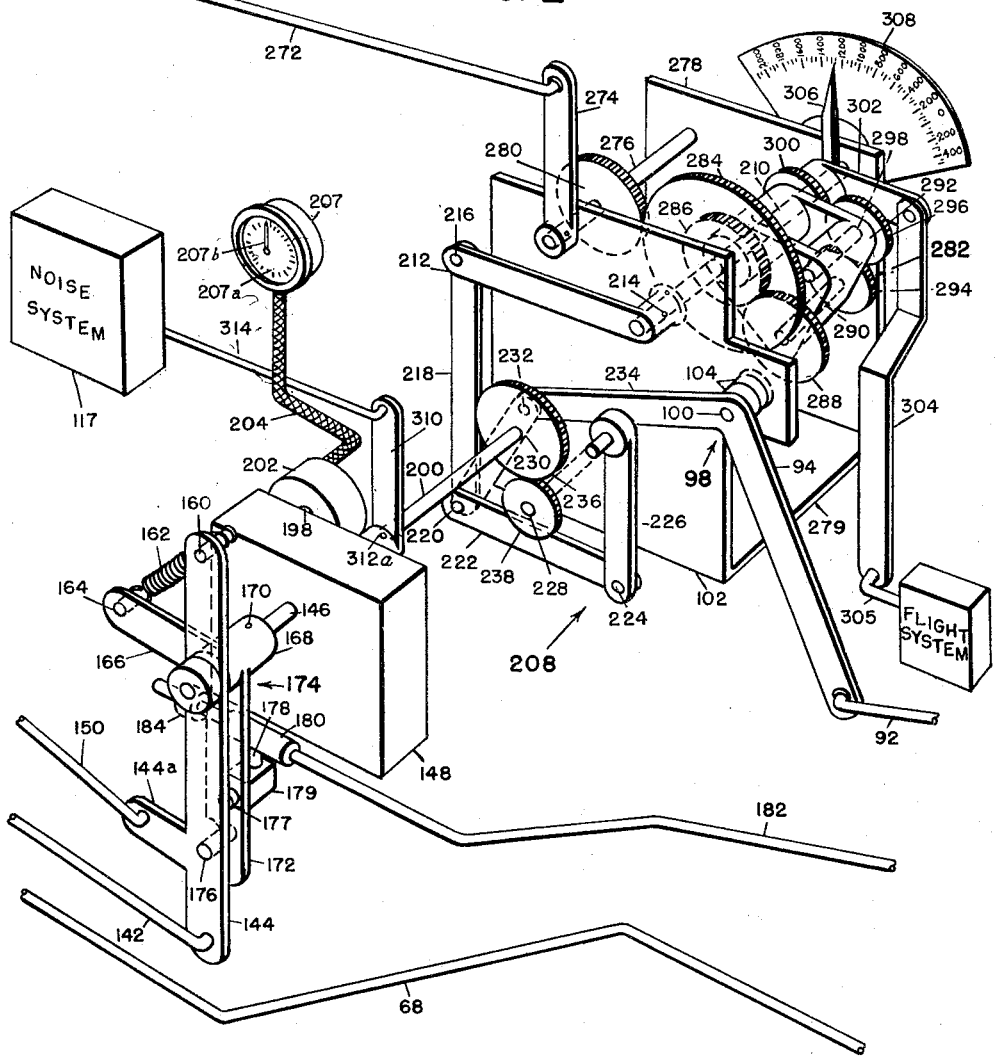

May 15, 1951 K. H. CHAPPLE ET AL 2,553,526
MAXIMUM AVAILABLE MANIFOLD PRESSURE AND
BRAKE HORSEPOWER COMPUTER
Filed Sept. 12, 1947 8 Sheets-Sheet 3

KENNETH H. CHAPPLE
RAYMOND E. KITTREDGE
INVENTOR

BY Donald V. Hiller
ATTORNEY

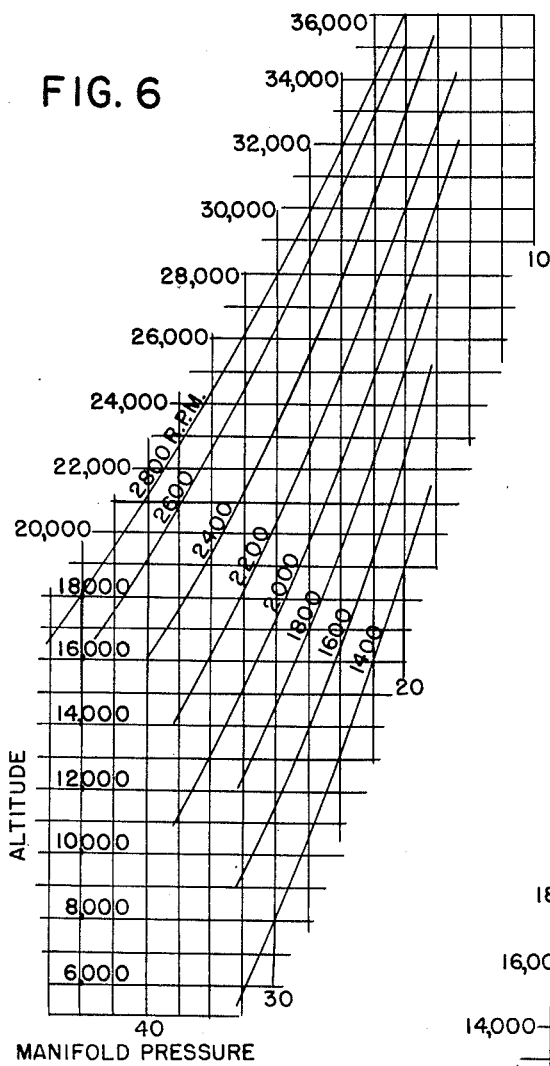
FIG. 6
MAXIMUM AVAILABLE MANIFOLD PRESSURE (HIGH BLOWER)
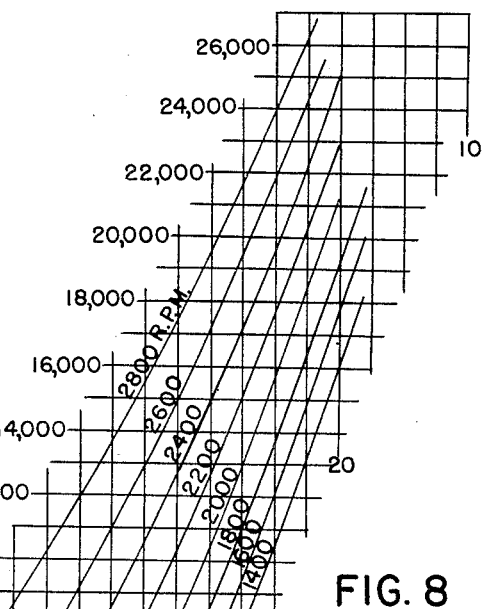
MAXIMUM AVAILABLE MANIFOLD PRESSURE (LOW BLOWER)
FIG. 8
KENNETH H. CHAPPLE
RAYMOND E. KITTREDGE
*INVENTORS*
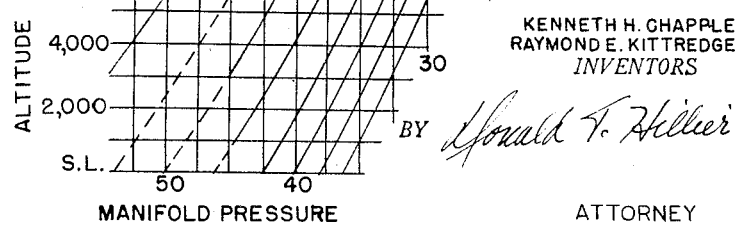

May 15, 1951     K. H. CHAPPLE ET AL     2,553,526
MAXIMUM AVAILABLE MANIFOLD PRESSURE AND
BRAKE HORSEPOWER COMPUTER

Filed Sept. 12, 1947     8 Sheets-Sheet 7

KENNETH H. CHAPPLE
RAYMOND E. KITTREDGE
*INVENTORS*

BY *Donald T. Hillier*

ATTORNEY

May 15, 1951 K. H. CHAPPLE ET AL 2,553,526
MAXIMUM AVAILABLE MANIFOLD PRESSURE AND
BRAKE HORSEPOWER COMPUTER
Filed Sept. 12, 1947 8 Sheets-Sheet 8
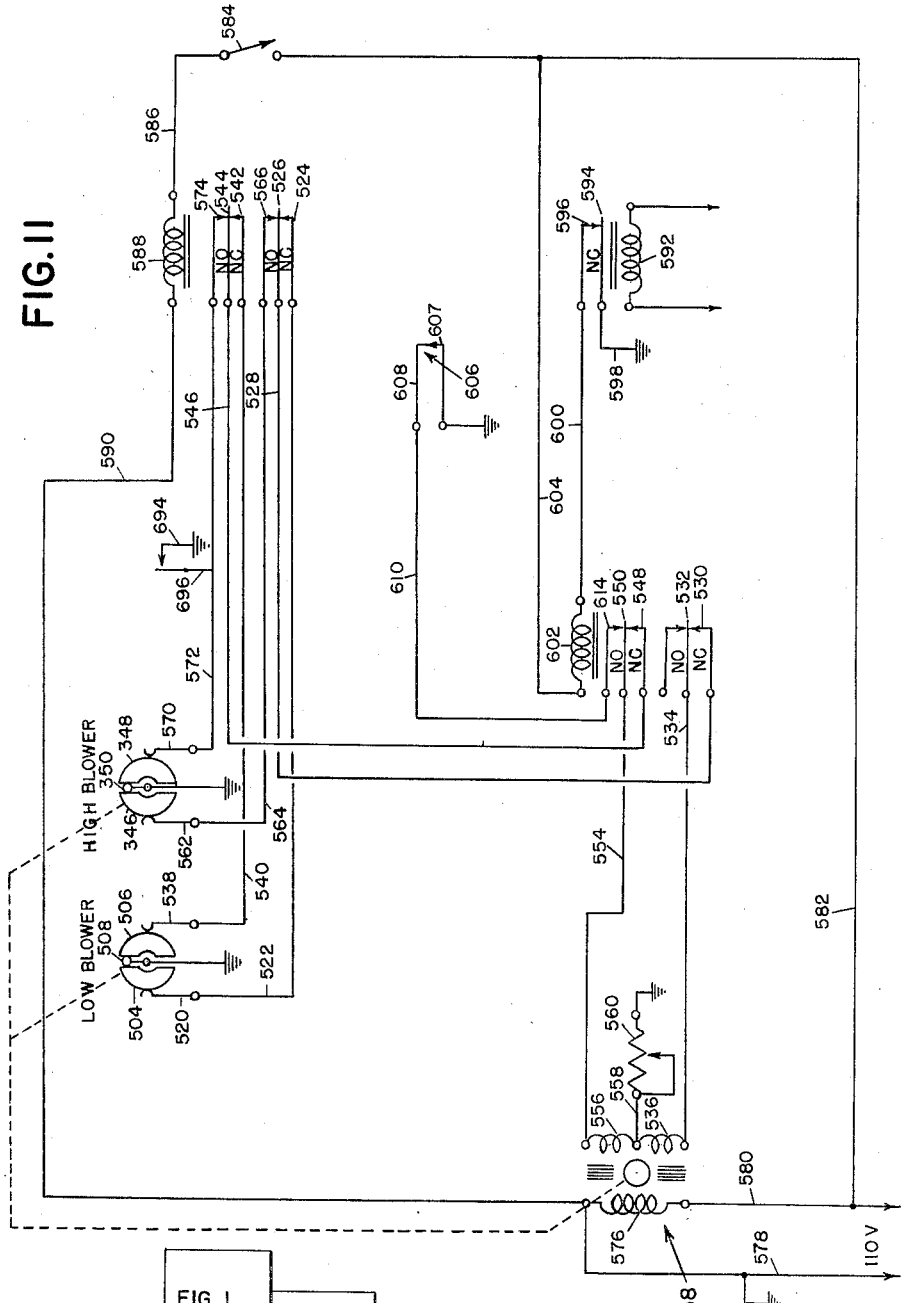
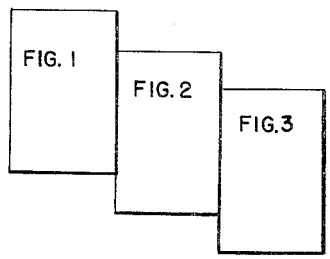
KENNETH H. CHAPPLE
RAYMOND E. KITTREDGE
INVENTORS
BY Donald T. Hillier
ATTORNEY Patented May 15, 1951

2,553,526

UNITED STATES PATENT OFFICE 2,553,526

MAXIMUM AVAILABLE MANIFOLD PRESSURE AND BRAKE HORSEPOWER COMPUTER

Kenneth H. Chapple, Binghamton, and Raymond E. Kittredge, Port Dickinson, N. Y., assignors to Link Aviation, Inc., Binghamton, N. Y., a corporation of New York Application September 12, 1947, Serial No. 773,662

7 Claims. (Cl. 35—13)

1

This invention relates to the art of grounded aviation trainers, and more particularly to an engine simulator forming a part of such trainers.

Grounded aviation trainers of the type to which this invention relates are generally mounted upon a stationary base and include a fuselage having a seat for a student and an instrument panel positioned ahead of the seat. The instrument panel carries a complement of instruments which simulate the instruments carried by the plane whose performance is being simulated by the trainer. Positioned within the fuselage are manually operable controls, such as the throttle lever, engine speed control lever, supercharger control, rudder pedals and stick or column control, which controls simulate the corresponding controls of the real plane represented by the trainer. Suitable computing devices are interposed between the manual controls in the cockpit and the instruments on the instrument panel to cause the instruments to give the same indications as the instruments in a real plane would give in the presence of corresponding actual control settings.

The invention of this application relates to improved computers interposed between the manual controls in the fuselage and the instruments on the instrument panel to cause the instruments to properly register according to the positions of the manual controls.

The engine of the type being simulated by the apparatus of this application is equipped with a manifold pressure regulator which automatically controls the butterfly valve associated with the engine to maintain the manifold pressure of the engine at the value for which the throttle lever (sometimes referred to in the case of engines equipped with such a regulator as the "boost control") is set at all times as long as the combined factors of altitude and engine speed are such that a manifold pressure equal to or greater than the manifold pressure for which the throttle lever is set can be obtained with the butterfly valve wide open. If the combined factors of engine speed and altitude are such that a manifold pressure equal to the manifold pressure for which the throttle lever is set cannot be obtained, it follows that the manifold pressure regulator cannot maintain the manifold pressure for which the throttle lever is set.

Accordingly, in the case of an engine of the type being simulated, for any combination of engine speed and altitude there is a maximum manifold pressure which may be obtained. If the throttle lever is set to produce a given manifold pressure, the manifold pressure regulator will automatically maintain the manifold pressure at that level regardless of changes in altitude and engine speed until the increase in altitude or decrease in engine speed, or both, are such that the manifold pressure cannot be produced, regardless of throttle setting. Thereafter, an increase in altitude or decrease in engine speed progressively decrease the manifold pressure which may be produced.

The functioning of an engine equipped with a manifold pressure regulator is simulated by the apparatus of this invention in the following manner:

The simulated throttle lever in the trainer is connected through intermediate mechanism to the simulated manifold pressure indicator, so that the reading of the indicator is normally controlled solely by the setting of the lever. Consequently, the student can set the lever to cause the indicator to give the desired simulated manifold pressure indication, just as in the case of the pilot flying a real plane the pilot sets the throttle lever to produce the desired manifold pressure.

In order to simulate the limiting effect of altitude and engine speed upon manifold pressure, there are provided by the apparatus of this invention a pair of maximum available manifold pressure computers which continuously compute the maximum available manifold pressure for the prevailing assumed engine speed and assumed altitude. The output of one of the maximum available manifold pressure computers at all times limits the reading of the simulated manifold pressure indicator so that the indicator cannot indicate a higher assumed manifold pressure than the prevailing assumed engine speed and assumed altitude should permit, regardless of the fact that the simulated throttle lever may be set to produce a higher simulated manifold pressure.

Two maximum available manifold pressure computers are provided because the engine of the type being simulated is provided with a supercharger control by means of which the pilot can cause the supercharger to run on the "high blower" or "low blower." The maximum available manifold pressure in the case of the engine being simulated, for any given assumed engine speed and any given assumed altitude, varies depending upon whether the supercharger is running on high blower or low blower. Accordingly, the apparatus of this invention provides a manual control which simulates the supercharger control of a real plane, and when this control is in the assumed high blower position one of the maximum available manifold pressure computers limits the reading of the manifold pressure indicator according to assumed engine speed and altitude, and when the control is in the assumed low blower position the other computer limits the reading of the indicator according to assumed engine speed and altitude.

Another important feature of the invention is a novel brake horsepower computer which combines the factors of assumed manifold pressure and assumed engine speed to determine the assumed sea level brake horsepower. The output of the brake horsepower computer is then modified by the factor of assumed altitude to produce the factor of brake horsepower at altitude.

The maximum available manifold pressure computers and the brake horsepower computer of this application are of the general type disclosed in the co-pending application of H. Frederick Schaefer, Jr., Serial Number 737,696, filed March 27, 1947 for Computer for Aviation Trainer and the Like.

The engine being simulated is equipped with a constant speed propeller, and another portion of the apparatus of this invention limits the assumed engine speed, as indicated by the provided simulated tachometer, when the throttle simulating lever is positioned rearwardly of the point required to produce the necessary assumed manifold pressure to maintain the assumed engine speed for which the provided simulated engine speed control lever is set.

Other associated features of the apparatus of this invention will become apparent upon a reading of this description.

For a detailed disclosure of the apparatus of this invention reference is made to the accompanying drawings wherein, Fig. 1 shows the simulated throttle control and engine speed control levers, as well as the maximum available manifold pressure computers, while Fig. 1A discloses the throttle lever compensating spring arrangement.

Fig. 2 discloses the brake horsepower computer and associated apparatus.

Fig. 4 is a rectilinear graph showing the brake horsepower produced by the engine being simulated for various manifold pressures and engine speeds, while

Figure 7:
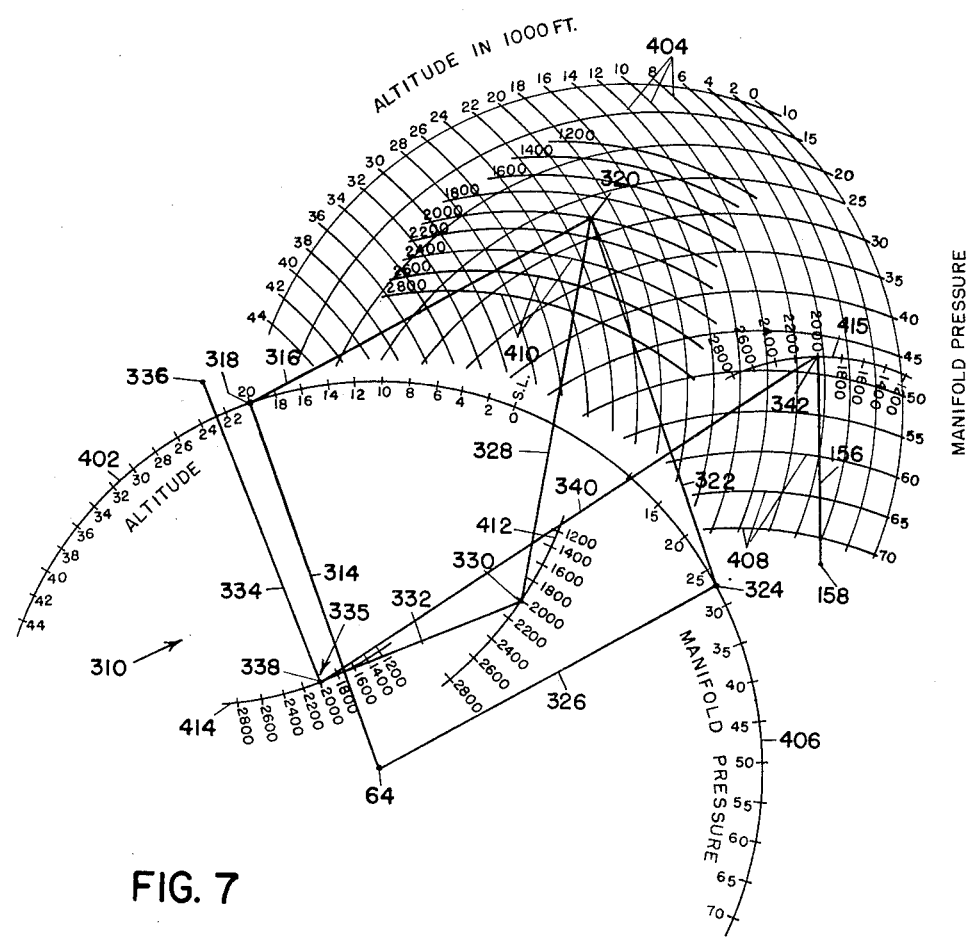

Fig. 6 is a rectilinear graph showing the manifold pressures produced by the engine being simulated for various engine speeds and altitudes when the supercharger is operating on high blower, while Fig. 7 shows the data given by the graph of Fig. 6 replotted in curvilinear form as well as the schematic construction of the maximum available manifold pressure computer for the high blower supercharger condition.

Figure 9:
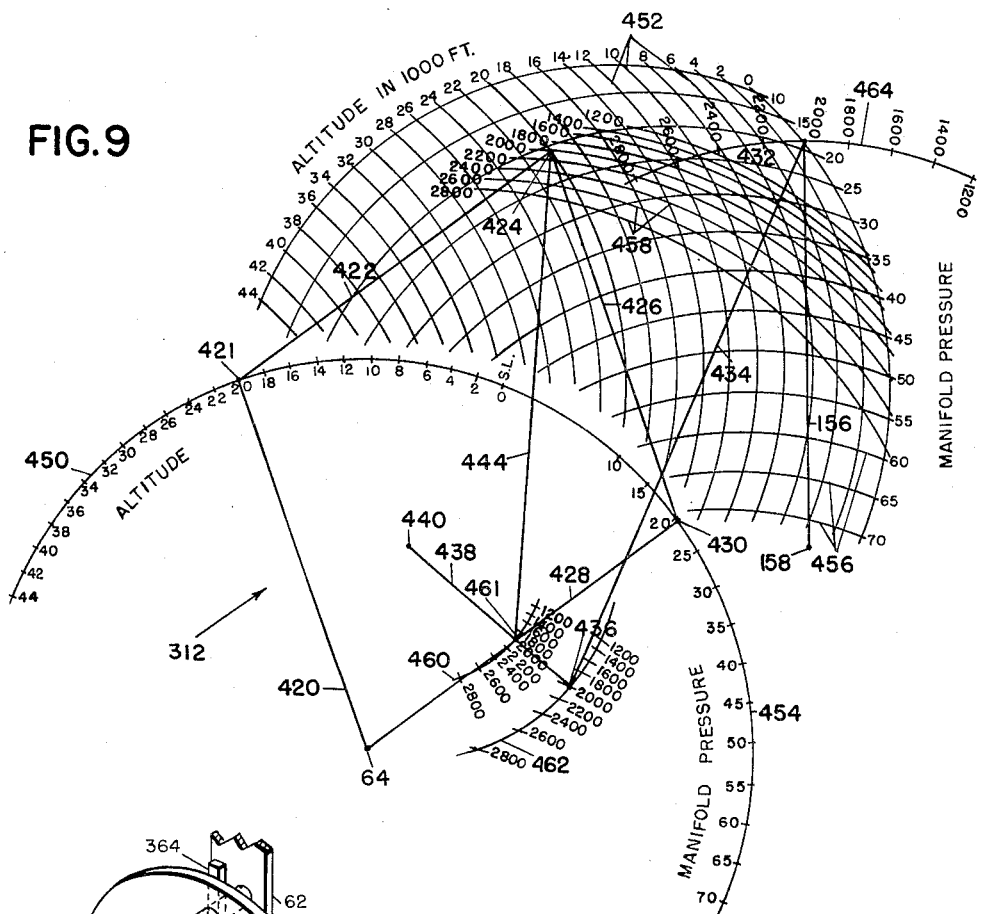

Fig. 8 is a rectilinear graph showing the manifold pressures produced by the engine being simulated for various engine speeds and altitudes when the supercharger is operating on low blower, while Fig. 9 shows the data given by the graph of Fig. 8 replotted in curvilinear form as well as the schematic construction of the maximum available manifold pressure computer for the low blower supercharger condition.

Figures 1, 10:
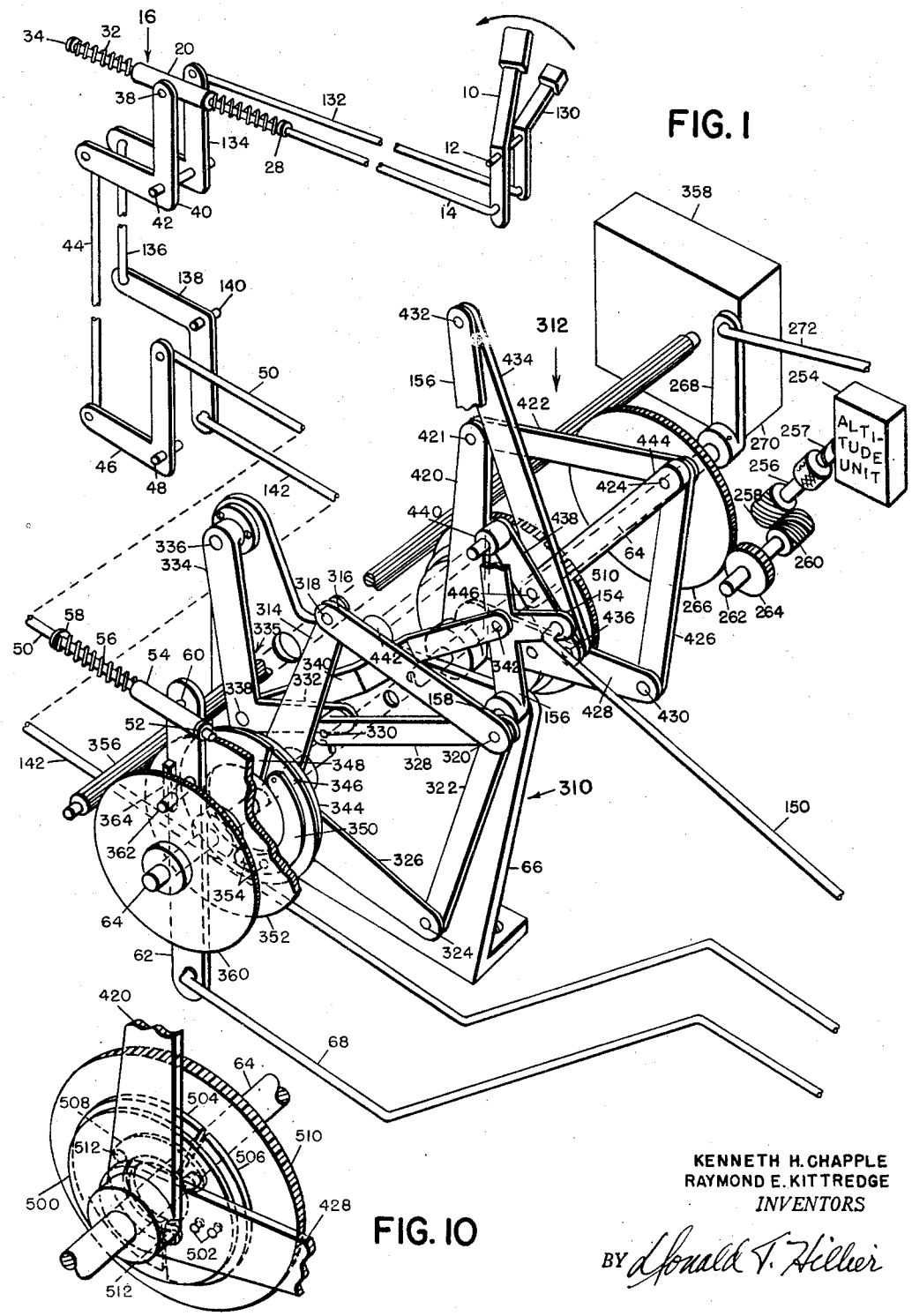

Fig. 10 is a detailed view of a portion of the maximum available manifold pressure computer for the low blower supercharger condition which is shown generally in Fig. 1.

Fig. 11 is a schematic diagram of the electrical circuits associated with the apparatus of this invention shown in the other drawings.

Figure 3:
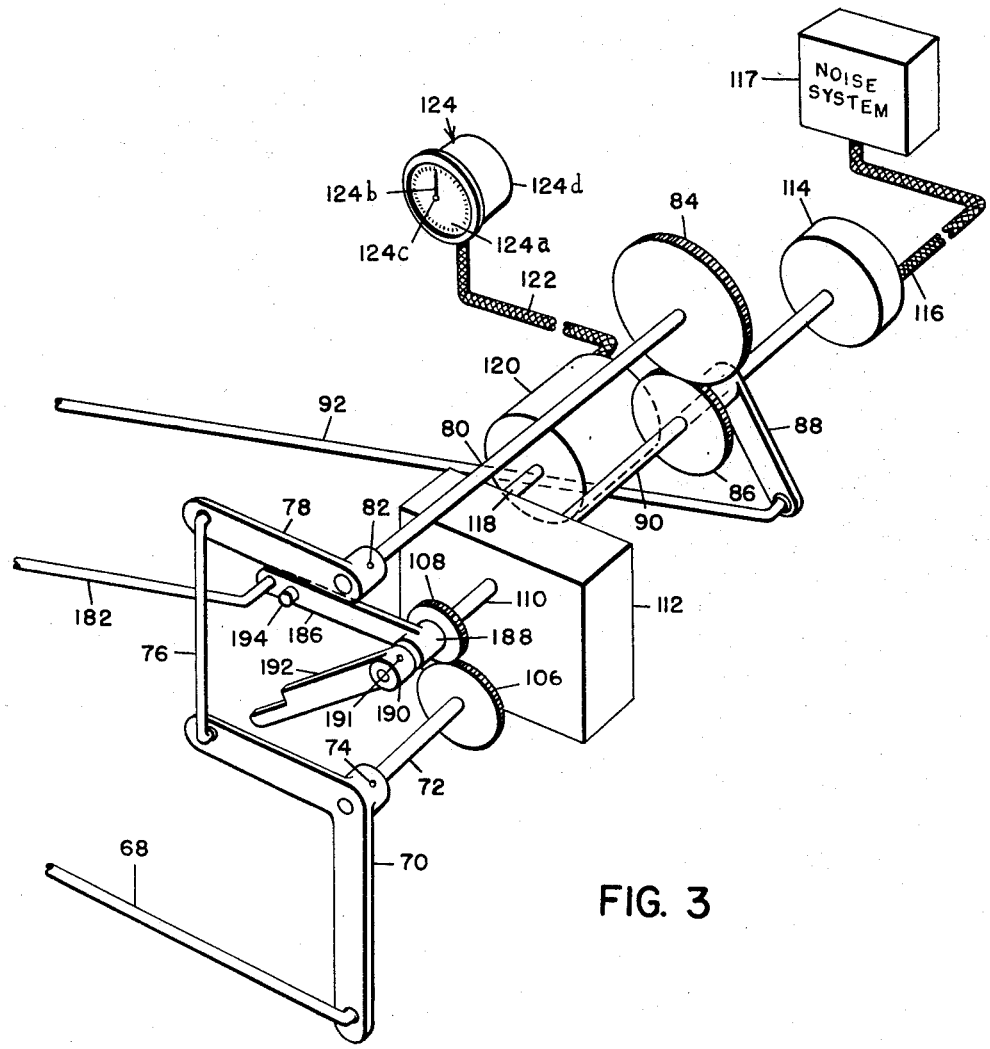
Fig. 3 shows the manifold pressure transmitter and associated apparatus.

Fig. 12 shows the relative positions in which Figs. 1, 2 and 3 may be placed to present a single view of the apparatus of those figures.

Figure 13:
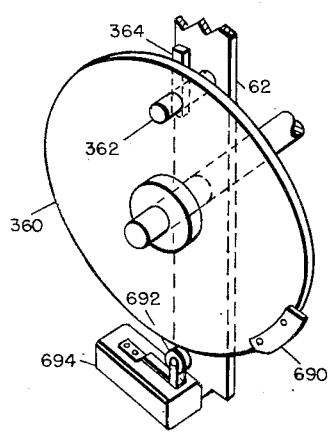

Fig. 13 discloses a portion of the electrical apparatus associated with the apparatus of Fig. 1.

Reference is made to Fig. 1 where the lever 10 which simulates the throttle control lever of a real plane is shown, this lever being movably mounted upon the rod 12 which is fixed within the fuselage of the trainer in a position corresponding to the positioning of the throttle control lever of a real plane. The trainer fuselage is not disclosed herein. The rear end of link 14 is pivotally attached to the lower end of lever 10, and mounted upon the forward end of link 14 is a positive type centering arrangement designated generally by 16. A detailed disclosure of this arrangement is shown in Fig. 1A wherein it is seen that there is affixed upon the link 14 the sleeve 18 which moves at all times with the link 14. An outer sleeve 20 encases the inner sleeve 18, and a pair of washers 22 and 24 encircle link 14, one of these washers bearing against each end of the two mentioned sleeves. A rear spring 26 encircles link 14, the forward end of this spring bearing against the washer 24, and the rear end of this spring bearing against the washer 28. The cotter pin 30 prevents washer 28 from moving to the rear under the compression of spring 26. A forward spring 32 is provided, the rear end of this spring bearing against the washer 22, and the forward end bearing against the washer 34 which is prevented from moving forward along link 14 by the cotter pin 36.

To the outer sleeve 20 is affixed the pin 38, upon which is mounted the upper arm of bellcrank 40, this bell crank being pivoted upon the rod 42 which also is suitably fixed within the fuselage of the trainer. The upper end of link 44 is pivotally attached to the lower arm of bellcrank 40, and the lower end of the vertical link 44 is pivotally attached to the lower arm of bellcrank 46. The bellcrank 46 is pivoted upon the fixed rod 48 which is suitably fixed inside the fuselage of the trainer. The forward end of link 50 is pivotally attached to the upper arm of bellcrank 46, and affixed upon the rear end of link 50 is the washer 52 against which normally bears the rear end of sleeve 54 which is free to slide upon link 50. The rear end of spring 56 bears against the forward end of sleeve 54, while the forward end of this spring bears against the washer 58 which is affixed upon link 50.

A pin 60 is attached to sleeve 54 and to the upper end of lever 62 which is freely mounted upon the horizontal shaft 64 which is suitably rotatably mounted in brackets which are affixed within the trainer fuselage. One such bracket, 66, is shown in Fig. 1, but the other supporting brackets are not shown.

Pivotally attached to the lower end of lever 62 is the forward end of link 68, the intermediate portion of which is shown in Fig. 2 and the rear portion of which is shown in Fig. 3. In the latter figure it will be seen that the rear end of link 68 is pivotally attached to the lower arm of bellcrank 70, which bellcrank is affixed upon the horizontal shaft 72 by means of set screw 74. The forward arm of bellcrank 70 has pivotally attached thereto the lower end of link 76, the upper end of which is pivotally attached to the forward end of arm 78, the rear end of which is affixed upon the horizontal shaft 80 by means of set screw 82. Upon the right end of shaft 80 is affixed the gear 84 which drives the gear 86 to which is affixed the arm 88. Gear 86 and arm 88 are free to rotate upon the shaft 90. The rear end of link 92 is pivotally attached to the outer end of arm 88, the forward end of link 92 being shown in Fig. 2 to be pivotally attached to the lower end of arm 94 which together with the arm 234 forms the bellcrank 96. This bellcrank is pivotally mounted upon the stud 100 which is carried by the fixed bracket 102, suitable spacers 104 being provided to offset the bellcrank 96 from the bracket 102. Bracket 102 is suitably fixed to the inside of the trainer fuselage.

Returning now to Fig. 3, the shaft 72 serves as the input shaft of the reversible follow-up motor or power amplifying assembly which is shown in block form and designated 112. Inasmuch as the construction of the assembly 112 is well known by those skilled in the art, a detailed disclosure of the same is not deemed necessary. This assembly may, for example, be of the type disclosed in Fig. 5A of U. S. Patent 2,439,169 dated April 6, 1948 and maturing from an application filed in the name of Raymond E. Kittredge. The assembly 112 has a first output in the form of the previously mentioned shaft 90 which forms the input of the potentiometer 114 which may be connected by the electrical conductor 116 to the other parts of a noise generating system 117 for producing sound effects simulating the running of the engine of a real aircraft. Potentiometer 114 is the volume control for such a system, and for a detailed disclosure of such a system reference is made to the copending patent application of Stanley I. Hayes and Milton S. Wade for Grounded Pilot Training Apparatus, Serial Number 634,492 filed December 12, 1945, now Patent Number 2,510,500, issued June 6, 1950.

A second output of the assembly 112 is the shaft 118 which is the input of the Selsyn-type transmitter 120 which is connected by conductor 122 to Selsyn receiver 124d which forms a part of an indicator designated generally by 124 and which simulates the manifold pressure indicator of a real plane, this indicator including a dial 124a which is graduated like the manifold pressure gauge of a real plane and a pointer 124b affixed upon the shaft 124c which is the output shaft of the Selsyn type receiver 124d.

In view of the above described arrangement, it will be appreciated that when the lever 10 simulating the throttle control lever of a real plane is moved ahead in Fig. 1, in simulation of the opening of the throttle in a real plane, the link 14 moves to the rear and by means of the spring assembly 16 and bellcrank 40 this motion is transferred to link 44 which moves upwardly. The motion of link 44 is transferred to link 50 by bellcrank 46, resulting in a movement to the rear of link 50. By means of washer 58, spring 56, sleeve 54 and pin 60, lever 62 is rotated clockwise, and link 68 moves ahead, resulting in a clockwise rotation of the bellcrank 70 in Fig. 3 and in an upward movement of link 76 in the same figure.

Arm 78 is rotated clockwise as is shaft 80 and gear 84, while gear 86 and arm 88 are rotated in the opposite direction, resulting in a movement to the rear of link 92 and in a counterclockwise rotation of the bellcrank 98 in Fig. 2.

When the bellcrank 70 in Fig. 3 is rotated clockwise, the shaft 72 moves in the same direction, resulting in an energization of the power amplifying assembly 112. The rotation of the output shaft 90 operates the volume control 114 to cause the noise producing system to generate a louder noise. The rotation of the shaft 118 operates the Selsyn transmitter 120 to cause the manifold pressure indicator 124 to indicate a higher assumed manifold pressure.

Without a detailed explanation, it will be appreciated that when the lever 10 in Fig. 1 is moved to the rear in simulation of the closing of the throttle of a real plane, all of the previously described apparatus will move in the opposite directions from those just described, resulting in a lower indicated assumed manifold pressure, a lower intensity of engine simulation noise, and a clockwise rotation of the bellcrank 98 of Fig. 2. Accordingly, the simulated manifold pressure indicator 124 is normally operated by the simulated throttle lever 10 to give an indicated assumed manifold pressure dependent only upon the setting of the lever. This arrangement simulates the operation of an engine equipped with a manifold pressure regulator wherein the regulator maintains the manifold pressure at the level for which the throttle lever is set, providing the engine speed and altitude are such as to permit the same.

Reference is again made to Fig. 1 where the lever 130 is shown, this lever simulating the engin speed control lever of a real plane. This lever is pivotally mounted upon the previously mentioned rod 12, and the rear end of link 132 is pivotally attached to the lower end of lever 130. The forward end of link 132 is pivotally attached to the upper arm of bellcrank 134 which is pivoted upon the previously mentioned rod 42, the upper end of link 136 being pivotally attached to the lower arm of bellcrank 134. The upper arm of bellcrank 138 is pivotally attached to the lower end of link 136, this bellcrank being pivoted upon the fixed rod 140, and the forward end of link 142 is pivotally attached to the lower arm of bellcrank 138. The rear end of link 142 is shown in Fig. 2 as having its rear end pivotally attached to the lower end of lever 144 which is freely mounted upon the shaft 146 which forms the input shaft of the R. P. M. transmitter 148 which is shown in block form. This transmitter may take the form of a conventional reversible follow-up motor similar to the assembly 112 shown in Fig. 3, and being well known to the art, is not shown herein in detail.

Integral with the lower portion of lever 144 is the forwardly extending extension 144a, to which is pivotally connected the rear end of link 150, the forward end of which is shown in Fig. 1 as being connected to the extension 154 of arm 156, the lower end of which is pivoted upon stud 158 carried by the fixed bracket 66.

Returning to Fig. 2, the upper end of lever 144 carries the pin 160 to which is attached the upper end of spring 162, the lower end of which is attached to the stud 164 carried by the arm 166 integral with hub 168 which is affixed upon the input shaft 146 of the R. P. M. transmitter 148 by means of set screw 170. Also integral with hub 168 is the downwardly extending arm 172. The arm 166, hub 168 and arm 172 form a bellcrank numbered 174.

The lower end of lever 144 carries a pin 176 projecting from the right side thereof, which pin is arranged to engage the forward edge of the arm 172 under conditions to be described.

The arm 172 carries the pin 177 which is swiveled within block 179. This block in turn has swiveled therewithin the vertical pin 178 which is affixed to the slider 180 which encircles the forward end of link 182, and a collar 184 is affixed upon the forward end of link 182.

The previously mentioned link 182 extends to the rear in Fig. 2, and in Fig. 3 it will be seen that the rear end of this link is pivotally attached to the outer end of arm 186 which is integral with hub 188 which is freely mounted upon the shaft 110. A second hub 190 is fixed upon the shaft 116 by set screw 191 and has integral therewith the arm 192. A pin 194 carried by the outer end of arm 186 projects from the left side of arm 186 to be engaged by the upper edge of arm 192 under conditions to be described.

The R. P. M. transmitter 148 of Fig. 2 has two output shafts, 198 and 200. The shaft 198 forms the rotor of potentiometer 202 which is connected by conductor 204 to the voltmeter type instrument 207 which simulates the tachometer of a real plane, and which includes a dial 207a graduated like the tachometer dial in a real plane and a needle 207b arranged to move over the dial to indicate the assumed engine speed. The shaft 200 is the R. P. M. input to the brake horsepower computer shown in Fig. 2 and designated generally by 208.

Considering now the functioning of the apparatus just described, when the R. P. M. lever 130 of Fig. 1 is moved ahead to produce a higher assumed engine speed, the link 132 moves to the rear and by means of bellcrank 134 the link 136 is moved upwardly. This motion of link 136 is transferred by bellcrank 138 to the link 142 which is moved ahead, and the lever 144 in Fig. 2 is rotated clockwise about the shaft 146. The upper end of lever 144 pulls spring 162 which in turn rotates the bellcrank 174 in the same direction as lever 144 to keep the forward edge of arm 172 against stud 176. Accordingly the input shaft 146 of the R. P. M. transmitter 148 is rotated clockwise, resulting in a similar rotation of the output shaft 200. Proper rotation of the output shaft 198 also takes place to adjust the potentiometer 202 to result in a higher reading on the simulated tachometer indicator 207, thus indicating a higher assumed engine speed. The clockwise rotation of bellcrank 174 results in a forward movement of slider 180 along link 182, but link 182 does not move because link 182 is normally positioned sufficiently far ahead that slider 180 does not engage collar 184.

The clockwise rotation of the lever 144 will also result in a forward movement of link 150.

It will be appreciated that when the engine speed lever 130 is moved to the rear in Fig. 1 to produce a lower assumed engine speed, by means of the elements connecting that lever with the lever 144 in Fig. 2, the lever 144 will be rotated counterclockwise. The pin 176 will engage the forward edge of arm 172, resulting in a counterclockwise rotation of the bellcrank 174 and input shaft 146 of the R. P. M. transmitter 148. The output shaft 200 of this transmitter will be rotated counterclockwise through the same angle as the input shaft 146, and the rotor 198 of the potentiometer 202 will be properly rotated to cause the indicator 207 to indicate a lower assumed engine speed.

The counterclockwise rotation of lever 144 and bellcrank 174 results in a movement to the rear of link 150, and slider 180 slides to the rear along link 182.

Accordingly, the just disclosed apparatus simulates the functioning of the engine being simulated, which engine is equipped with a constant speed propeller, in that the setting of the engine speed control lever 130 normally alone determines the assumed speed of the engine as indicated by the tachometer 207.

In the functioning of an engine equipped with a constant speed propeller, the engine speed is ordinarily determined by the setting of the engine speed lever. However, to maintain any given engine speed for which the engine speed lever may be set, a certain minimum manifold pressure must be produced. Expressed in another manner, for any given manifold pressure there is a highest possible engine speed that may be attained—regardless of the setting of the engine speed lever. The previously disclosed apparatus of this invention simulates this functioning of the engine being simulated in the following manner:

Assuming that the engine speed lever 130 of Fig. 1 is positioned to produce a certain assumed engine speed, and that the throttle control lever 10 is positioned to produce the required assumed manifold pressure to maintain that assumed engine speed, and the throttle control lever 10 is then moved to the rear to the position which produces an assumed manifold pressure which is less than the manifold pressure required to maintain the speed of the engine at the speed for which lever 130 is set, the link 68 in Fig. 3 will be moved to the rear resulting in a counterclockwise rotation of the bellcrank 70 and shaft 72. The assembly 112 is energized and the output shaft 110 is rotated clockwise as is the arm 192 carried thereby. The upper edge of this arm engages the pin 194 carried by the arm 186, rotating this arm clockwise and pulling the link 182 to the rear. The movement to the rear of link 182 will result in a similar movement of the collar 184 affixed upon the forward end thereof, and this collar will engage the forward end of slider 180 which is connected to the arm 172 of bellcrank 174 by means of the pins 177 and 178 and the block 179. Bellcrank 174 will be rotated counterclockwise—in the same direction that it is moved when the R. P. M. setting lever 130 is moved to the rear to produce a lower assumed engine speed. Accordingly, the R. P. M. transmitter 148 will be operated in the required direction to rotate shaft 200 counterclockwise and to rotate the shaft 198 to produce a lower assumed engine speed indication as given by instrument 207.

The counterclockwise rotation of the bellcrank 174 results in a pulling upon the spring 162, but the lever 144 is not rotated counterclockwise because the link 142 connected to the bottom thereof is held stationary. Consequently, spring 162 becomes elongated.

Generally speaking, arm 192 in Fig. 3 is arranged to engage the stud 194 whenever the assumed manifold pressure is below 36 inches which is the amount necessary to maintain an assumed engine speed of 2800 R. P. M.—the highest speed possible of the engine being simulated. As the assumed manifold pressure falls an increasingly greater amount below 36 inches, it will be appreciated that the maximum attainable assumed engine speed becomes progressively less. Accordingly, as the assumed manifold pressure becomes increasingly less, by the arrangement shown in Fig. 3 the link 182 is moved farther to the rear, resulting in a similar movement of the collar 184. This movement to the rear of collar 184 limits the clockwise turning of bellcrank 174 by engaging slide 180, and consequently limits the clockwise positioning of the input shaft 146 of the R. P. M. transmitter 148—the direction in which shaft 146 is rotated with an increase in assumed engine speed. In the event the position of collar 184 prevents slider 180 from moving ahead to the position that it would normally occupy for the prevailing position of the engine speed lever 130, the lever 144 assumes its normal clockwise position for the setting of the engine speed lever, but inasmuch as bellcrank 174 has its clockwise position limited, spring 162 is elongated, and the forward edge of arm 172 merely becomes displaced from pin 176. It will be noted that the position of link 150 is not affected by the limiting effect of assumed manifold pressure. In the foregoing manner the position of collar 184 which is set by the factor of instant assumed manifold pressure limits the clockwise rotation of the input shaft 146 of the R. P. M. transmitter so that the instant assumed engine speed at no time can be higher than that which can be produced by the instant assumed manifold pressure.

As stated, this arrangement simulates the actual performance of an aircraft engine equipped with a constant speed propeller wherein the actual speed of the engine can be maintained only in the event that sufficient manifold pressure is being produced.

*Brake horsepower computer*

The brake horsepower computer of this invention which combines the factors of instant assumed manifold pressure, instant assumed engine speed and instant assumed altitude to determine the instant assumed brake horsepower being produced will now be disclosed.

Figure 4:
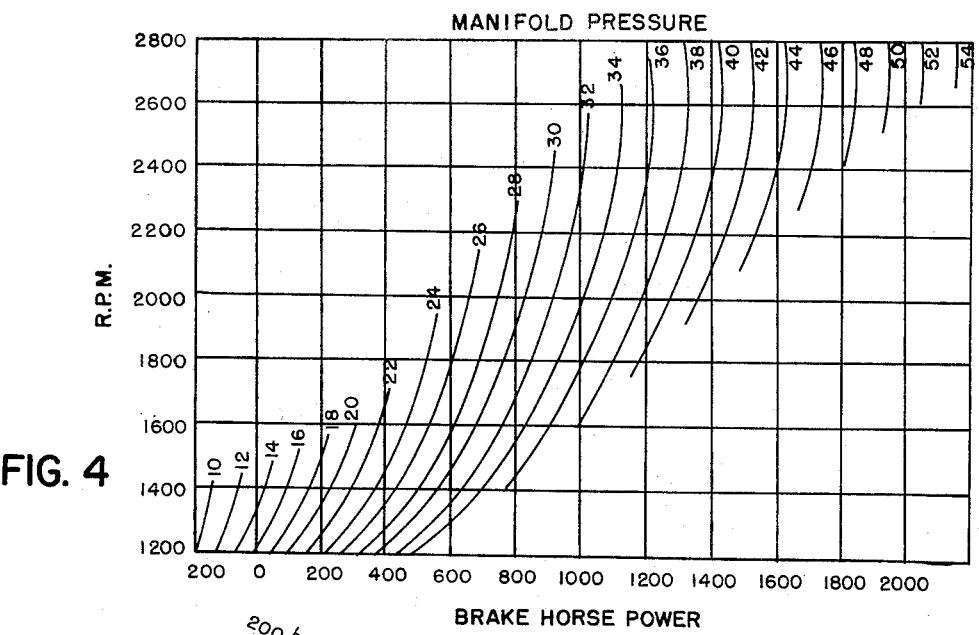

Reference is now made to Fig. 4 which is a graph of the actual performance of the engine being simulated by the apparatus of this invention and which shows the brake horsepower produced by the engine under varying conditions of manifold pressure and engine R. P. M. For example, a manifold pressure of 37.5 inches and an engine speed of 2000 R. P. M. produces a brake horsepower of about 1150. Other brake horsepowers for selected manifold pressures and engine speeds may be obtained by inspection from the graph of Fig. 4.

Figure 5:
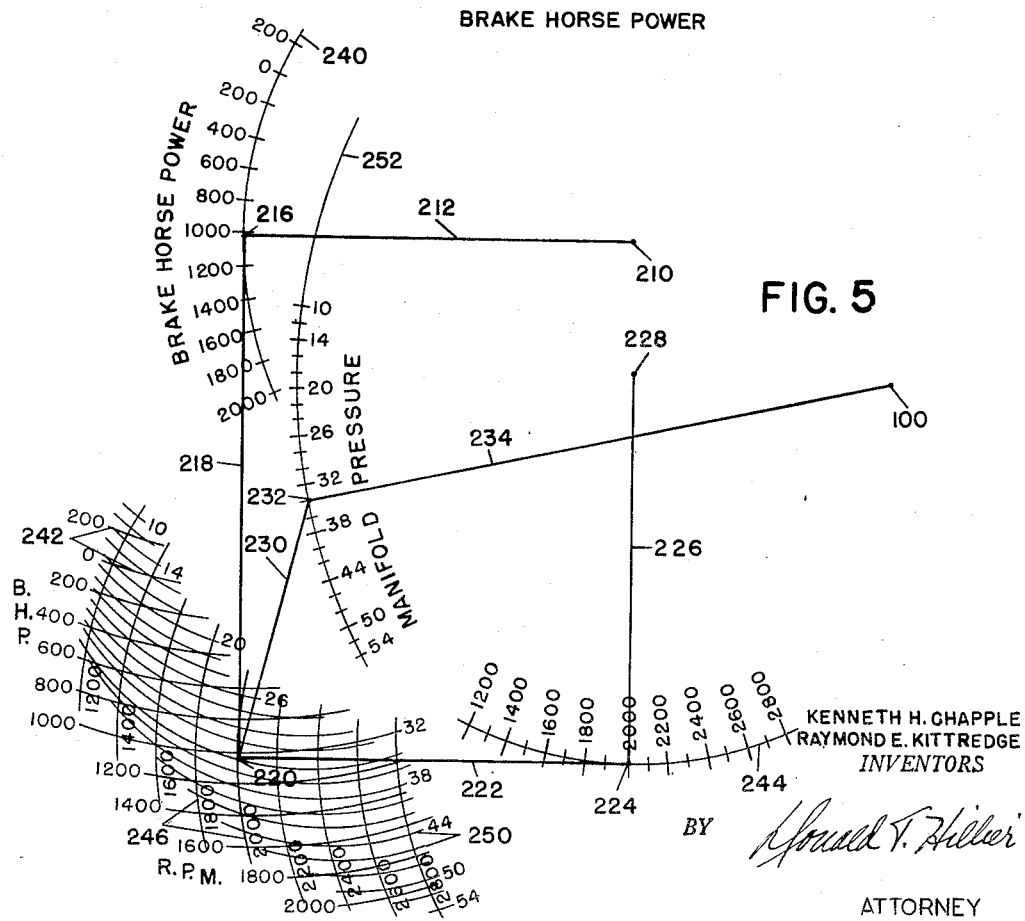
Fig. 5 shows the data given by the graph of Fig. 4 replotted in curvilinear form as well as the schematic construction of the brake horsepower computer.

Reference is now made to Fig. 5 where the linkage arrangement of the brake horsepower computer 208 is schematically illustrated, and to Fig. 2 where the actual structure of the computer is shown. The computer includes the fixed pivot which takes the form of shaft 210, the output arm of the computer being designated 212 and being affixed upon the shaft 210 which is held by bracket 102 by means of set screw 214. The pivot 216 pivotally connects the forward end of arm 212 with the upper end of link 218, the lower end of this link being pivotally held by the master pivot 220 which is free to move in any direction throughout a selected plane. The master pivot 220 also carries the forward end of link 222, the rear end of which is held by pivot 224 which also holds the lower end of arm 226. The upper end of this arm is carried by the fixed pivot which takes the form of a horizontal shaft 228.

The lower end of link 230 is also carried by the master pivot 220, the upper end of this link being attached to the pivot 232 which holds the upper end of link 230 relative to the forward end 234 of the previously mentioned bellcrank 98, the rear end of which is designated 94.

The shaft 200 which is one of the outputs of the R. P. M. transmitter and is always rotationally positioned according to the instant assumed engine speed carries the spur gear 236 which drives the meshing spur gear 238 affixed upon the left end of the shaft 228. It will therefore be understood that the position of shaft 228 and the position of the arm 226 about the axis of shaft 228 is always in accordance with the instant assumed engine R. P. M.

The apparatus of Figs. 2 and 5 now being considered was designed in the following manner: The location of the fixed pivot 210 was selected, the position of arm 212 about pivot 210 being selected as the measure of the instant assumed brake horsepower. The brake horsepower arc 240 was then drawn, this arc having as its center the fixed pivot 210 and being of a radius equal to the length of arm 212. The arc was then divided into equal segments of convenient length, to locate a plurality of points therealong, and these points labelled from —200 to 2000 in increments of 200. The length of link 218 was then selected, and employing a radius equal to the selected length of link 218 a plurality of generally parallel arcs were drawn, each of the arcs having as its center a different one of the prelocated points along arc 240. For convenience, each of the arcs so drawn was labelled with the same number or value corresponding to the selected point along arc 240 which is its center.

The position of the fixed pivot 228 was then selected, and a convenient length for the arm 226 was similarly chosen. Using the position of fixed pivot 228 as a center, the R. P. M. arc 244 was drawn, this arc having a radius equal to the selected length of link 226. Arc 244 was then divided into segments of convenient length, to locate a plurality of points therealong, and the points were numbered from 1200 through 2800 in increments of 200. A convenient length for link 222 was selected, and by employing a radius equal to the selected length and using each of the selected points along arc 244 as a center, a plurality of generally parallel arcs 246 were drawn. Each of these arcs may be labelled, for convenience, with the same value as the value of the point along arc 244 used as a center in drawing the arc. It will be noted that the relative positions of the fixed pivots 210 and 228, and the relative lengths of the arms 212 and 226, and the relative length of the links 218 and 222, as well as the positions of the arcs 240 and 244 and the length of the segments thereof were chosen so that the brake horsepower lines 242 and R. P. M. arcs 246 run generally at right angles to one another.

The next step was the plotting in of the manifold pressure arcs 250 relative to the constructed brake horsepower arcs 242 and R. P. M. arcs 246 so that for any combination of assumed engine speed and assumed manifold pressure the value of the assumed brake horsepower upon the graph in Fig. 5 would be the same as in Fig. 4 within reasonable tolerances. Perfect conformance between the graphs of Fig. 4 and Fig. 5 is unlikely because of the necessity of producing manifold pressure arcs 250 all having an equal radius, the centers of each of the arcs 250 in turn defining another arc—in this case the arc 252. By comparison of Figs. 4 and 5 it will be seen that the given values of manifold pressure and R. P. M. show an approximately equal brake horsepower is produced. For example, in the graph of Fig. 4 a manifold pressure of 34 inches and an engine speed of 2000 R. P. M. produce a brake horsepower of 1000. In Fig. 5 a manifold pressure of 34 inches and an engine speed of 2000 R. P. M. produce a brake horsepower of 1025.

Having drawn in the manifold pressure arc for each value of manifold pressure between 10 and 54 inches, in increments of 2 inches, the center of each arc so plotted in was then ascertained. The approximate centers are shown on Fig. 5 and for convenience are labelled with numbers corresponding to the value of each of the manifold pressure arcs. The approximate center of an arc 252 passing through all of the selected centers of the manifold pressure arcs 250 was ascertained, and was selected as the location of the fixed pivot 100, the length of the radius of the arc 252 being equal to the length of link 234.

Inasmuch as the shaft 228 is always rotationally positioned by the R. P. M. transmitter 148 in accordance with the instant assumed engine R. P. M., the arm 226 is always positioned about the fixed pivot 228 in accordance with the instant assumed value of the same factor. For example, referring to Fig. 5, when the instant assumed engine speed is 1200 R. P. M., 2000 R. P. M., or 2600 R. P. M., the arm 226 will be positioned so that the pivot 224 is upon the 1200 mark, the 2000 mark, of the 2600 mark, respectively, of arc 244. Also, when the pivot 224 is on the 1200 mark upon arc 244, the master pivot 220 must be positioned at some point along the 1200 R. P. M. arc 246; when the pivot 224 is above the 2000 mark, as shown in Fig. 5, the master pivot 220 must be at some point along the 2000 R. P. M. arc 246; and when the master pivot 224 is above the 2600 mark on arc 244 the master pivot 220 must be at some point along the 2600 arc 246. For any value of instant assumed R. P. M., the pivot 224 will be properly positioned along the arc 244, and the master pivot 220 will be properly positioned relative to the R. P. M. arcs 246.

By virtue of the apparatus shown in Fig. 3 which is responsive to the positioning of the throttle lever 10, the arm 234 of bellcrank 98 of Fig. 2 is always positioned about the fixed pivot 100 in accordance with the instant assumed manifold pressure, and accordingly the pivot 232 will always be positioned along the manifold pressure arc 252 of Fig. 5 in accordance with the instant assumed value of that factor. For example, when the instant assumed manifold pressure is 10 inches, the pivot 232 will be above the 10 mark on arc 252; when the instant assumed manifold pressure is 32 inches, the pivot 232 will be above the 32 mark on arc 252; and when instant assumed manifold pressure equals 50 inches, the pivot 232 will be above the 50 mark on arc 252. By virtue of the explained method of construction of the brake horsepower computer 208, when pivot 232 is above the 10 mark of arc 252, the master pivot 220 must be at some point along the manifold pressure arc 250 marked 10; when the pivot 232 is above the 32 inch mark upon arc 252, the master pivot 220 must be at some point along the arc 250 marked 32; and when the pivot 232 is above the 34 inch mark along arc 252, as shown in Fig. 5, the master pivot 220 will be at some point upon the arc 250 marked 34. For any intermediate value of assumed manifold pressure, the position of arm 234 about the fixed pivot 100 will be properly positioned, as will the position of pivot 232 along the arc 252. Accordingly the master pivot 220 will be properly positioned relative to the manifold pressure arcs 250.

The apparatus shown in the drawings is arranged so that the pivot 224 is positioned along the R. P. M. arc 244 according to the indication given by tachometer 207, and so that pivot 232 is positioned along the manifold pressure arc 252 according to the indication given by the manifold pressure gauge 124. Consequently, the master pivot 220 is properly positioned relative to the R. P. M. arcs 246 in accordance with the instant assumed engine speed, and the master pivot 220 is properly positioned relative to the manifold pressure arcs 250 in accordance with the instant assumed manifold pressure. Inasmuch as the instant assumed brake horsepower produced by any combination of R. P. M. and manifold pressure may be obtained by reference to Fig. 5, it will be appreciated that by properly positioning the master pivot 220 relative to the manifold pressure arcs 250 in accordance with the instant assumed manifold pressure, as well as positioning the master pivot 220 relative to the R. P. M. arcs 246 in accordance with the instant assumed engine speed, the master pivot 220 will necessarily be properly positioned relative to the brake horsepower arcs 242 for the instant values of assumed manifold pressure and R. P. M. Accordingly, the pivot 216 will always be positioned along the brake horsepower arc 240 in accordance with the instant assumed brake horsepower. For example, in the case illustrated in Fig. 5, when the assumed engine speed is 2000 R. P. M. and the assumed manifold pressure is 34 inches, the master pivot 220 will be positioned above the 2000 R. P. M. curve 246 and above the 34" manifold pressure curve 250. This positioning places the master pivot 220 in about the 1025 brake horsepower position, and the pivot 216 will be positioned in the 1025 brake horsepower position. If the assumed engine speed were 1400 R. P. M. and the assumed manifold pressure 26 inches, the master pivot 220 would be positioned above the 400 horsepower arc 242 and the pivot 216 would be above the 400 mark on arc 240.

Inasmuch as the pivot 216 is always properly positioned along the arc 240 in accordance with the instant assumed brake horsepower being produced, it will be appreciated that the rotational position of the output arm 212 and the rotational position of shaft 210 upon which arm 212 is fixed may be used as a measure of the instant assumed brake horsepower.

It will be noted that the graphs of Figs. 4 and 5 show that a negative horsepower is developed under conditions of very low manifold pressure and low engine speed. The engine being simulated does not, of course, ever actually develop a negative horsepower, but in flight when the engine speed and manifold pressure are sufficiently low, the resistance offered by the propeller driven by the engine is greater than the thrust produced by the propeller so that the effect is the same as though a negative horsepower were being produced. By designing the brake horsepower computer so that the master pivot 220 can move beyond the zero horsepower arc 246, and so that the output arm 212 can move clockwise beyond the zero horsepower position, the net effect of the engine in a plane in actual flight operating at low engine speed and low manifold pressure may be simulated.

In an engine of the type being simulated by the apparatus of this application, an increase in altitude results in an increase in the brake horsepower produced by the engine because of the reduction of back pressure upon the engine. The brake horsepower computer, as thus far described, computes the brake horsepower for an assumed sea level or zero altitude condition. Means will now be disclosed for modifying the assumed brake horsepower produced at sea level by the instant assumed engine speed and manifold pressure as changes in the factor of assumed altitude occur.

Reference is made to Figs. 2 and 1 where the altitude unit in the trainer is shown in block form and designated 254. The detailed construction of such a unit is immaterial insofar as this application is concerned. The altitude unit may be of the type disclosed in U. S. Patent 2,099,857 dated November 23, 1937 and issued to Edwin A. Link, Jr. for Trainers for Aviators, or of the type disclosed in the copending application of Karl A. Kail Serial Number 672,875 filed May 28, 1946, now Patent Number 2,510,578, issued June 6, 1950, for Aviation Trainer, or of any other selected type. In the illustrated case, the altitude unit 254 positions the flexible cable 256 contained in sheathing 257 in accordance with the instant assumed altitude of the trainer. The worm gears 258 and 260 are similarly positioned, as are the shaft 262 and gears 264 and 266, which latter gear is affixed upon the previously mentioned horizontal shaft 64. Shaft 64 carries upon its right end the arm 268 which is affixed thereupon by means of set screw 270, and the forward end of link 272 is pivotally attached to the upper end of arm 268. The rear end of link 272 is pivotally attached to the upper end of arm 274 and the lower end of this arm is affixed upon the horizontal shaft 276 which is held by the plates 278 and 162, these two plates being fixedly held by the base 279 which is preferably affixed within the fuselage of the trainer. Affixed upon shaft 276 is the gear 280 which is the input gear of the planetary differential designated generally by 282. Gear 280 drives the gear 284 which has affixed thereto the gear 286 which drives the spur gear 288 affixed upon shaft 290 which is held by the differential spider 292. Affixed upon the right end of shaft 290 is the gear 294 which in turn drives gear 296 which is affixed upon the shaft 298 held by spider 292. The gear 296 in turn drives gear 300 which is freely mounted upon shaft 210, but which has affixed thereto the arm 302, to the outer end of which is affixed the upper end of the vertical link 304. The gears 284 and 286 are freely mounted upon shaft 210, while the differential spider 292 is pinned to shaft 210.

As the shaft 210 is rotated counterclockwise in Fig. 2 as a result of an increase in the sea level brake horsepower, the differential spider 292 will rotate in the same direction carrying the gear 300 therewith. Accordingly, the arm 302 which is pinned to gear 300 will be rotated counterclockwise, and the vertical link 304 will move upwardly. As the factor of assumed altitude increases, the altitude unit 254 is operated to rotate the gear 266 counterclockwise in Fig. 1, rotating shaft 64 and arm 268 in the same direction, and moving link 272 ahead. Arm 274, shaft 276 and gear 280 are rotated counterclockwise, resulting in a clockwise rotation of gears 284 and 286. Gear 288, shaft 290, and gear 294 will be rotated counterclockwise, while gear 296 will be rotated clockwise, resulting in a counterclockwise rotation of gear 300 and arm 302, and in an upward motion of link 304. Accordingly, as the factor of assumed altitude increases, the link 304 is moved upwardly—in the same direction in which it is moved when shaft 210 is rotated counterclockwise in response to an increase in the sea level brake horsepower.

It will be appreciated without a detailed explanation that when the brake horsepower computer output arm 212 of Fig. 2 is rotated clockwise by changes in the instant assumed manifold pressure and R. P. M. to produce a lower assumed brake horsepower, the apparatus shown in Fig. 2 will operate to move the link 304 downwardly—in the opposite direction from which it is moved in response to an increase in the factor of assumed brake horsepower. At the same time, when the altitude unit 254 is operated to produce a lower assumed altitude, the gear 266 will be rotated clockwise, and through the intermediate connecting elements the gear 300 will be rotated clockwise as will the arm 302, and the vertical link 304 will be moved downwardly.

Accordingly, the planetary differential 282 combines the factor of assumed altitude with the factor of sea level brake horsepower produced, to position the vertical link 304 in accordance with the instant assumed brake horsepower, and the vertical position of link 304 may be taken as a measure of the instant assumed brake horsepower, which factor depends upon the controlling variables of assumed engine speed, assumed manifold pressure, and assumed altitude.

The vertical link 304 may be connected to the flight system in the trainer by means of any suitable interconnecting apparatus, as by link 305. The flight system may be of any desired type or construction, and for one such system reference is made to the co-pending application of Charles J. Kidder, Serial No. 778,712, filed October 8, 1947, for Flight Computer for Grounded Aviation Trainers.

In Fig. 2 it will be seen that there is affixed to the arm 302 a pointer 306 which is arranged to move over the stationary dial 308. This dial may be graduated in terms of assumed brake horsepower. By means of this pointer and dial arrangement the instant assumed brake horsepower being produced may be ascertained, and the functioning of the brake horsepower computer 208 may be easily checked by reference to indicator 207 to determine the instant assumed R. P. M. of the engine, by reference to indicator 124 to determine the instant assumed manifold pressure being produced, by reference to the altimeter in the trainer to ascertain the instant assumed altitude, and then by reference to a suitable graph to ascertain the assumed brake horsepower that should be produced for the prevailing assumed engine R. P. M., manifold pressure and altitude.

Also shown in Fig. 2 is the arm 310, the lower end of which is affixed upon the R. P. M. shaft 200 by means of set screw 312a. The link 314 has its rear end connected to the upper end of this arm, and this link is connected to the frequency control of the noise system 117 to vary the frequency of the noise generated in accordance with the instant assumed R. P. M. of the engine.

*Maximum available manifold pressure computers*

It has been previously explained that in the case of the engine being simulated, which is equipped with a manifold pressure regulator, the setting of the throttle lever normally determines the manifold pressure which will be produced, and the regulator automatically maintains the manifold pressure at that level regardless of changes in altitude and engine speed, unless the combined factors of altitude and engine speed are such that the engine cannot produce the manifold pressure for which the throttle lever is set. It has also been previously shown that the apparatus of this invention provides a simulated manifold pressure gauge connected to the simulated throttle lever so that the reading of the instrument is normally dependent only upon the setting of the lever. In that fashion the functioning of the regulator of the engine in question is simulated, because the reading of the simulated manifold pressure gauge is normally determined solely by the setting of the throttle lever. To complete the simulation, means will now be disclosed whereby when the factors of assumed altitude and assumed engine speed are such that under corresponding real conditions the regulator in the plane could not maintain the manifold pressure for which the throttle lever is set, the assumed manifold pressure as indicated by the simulated manifold pressure gauge will be limited by the proper amount depending upon the assumed engine speed and altitude.

Inasmuch, as has been stated, the engine being simulated is equipped with a supercharger which may be operated on high blower or low blower, and that for any given conditions of engine speed and altitude the maximum available manifold pressure differs, depending upon whether the supercharger is operating on high blower or low blower, two maximum available manifold pressure computers are provided—one being operative when it is assumed the engine is operating on high blower and the other being operative when it is assumed the engine is operating on low blower.

Reference is now made to Fig. 1 wherein there are disclosed two novel computing arrangements for limiting the factor of assumed manifold pressure according to the instant assumed values of engine speed and altitude. Two such arrangements are disclosed in Fig. 1, the apparatus designated generally by 310 being operative to limit assumed manifold pressure when it is assumed that the supercharger control is in the high blower position, and the apparatus designated generally by 312 being operative to limit the factor of assumed manifold pressure when it is assumed that the supercharger control is in the low blower position.

Fig. 6 is a rectilinear graph showing the maximum available manifold pressure produced by an engine of the type being simulated at various altitudes and various engine speeds. For example, this graph shows that at 22,000 feet of altitude and 2000 R. P. M. engine speed, a manifold pressure of 25 inches is produced.

Referring now to Figs. 1 and 7, the previously mentioned horizontal shaft 64 is disclosed, and the lower end of arm 314 is affixed upon shaft 64 to be positioned thereby. To the upper end of arm 314 the forward end of link 316 is attached by means of pivot 318, the rear end of this link carrying the pivot 320 to which is pivoted the upper end of link 322. The pivot 324 connects the lower end of link 322 and the rear end of arm 326, the forward end of arm 326 being freely mounted upon shaft 64. The upper end of link 328 is also pivotally carried by pivot 320, the lower end of this link being held by pivot 330 carried by the rear end of arm 332 which, together with the arm 334, forms a bellcrank 335 which is pivoted upon the fixed stud 336, which is held by the casting 66. The elbow of the bellcrank 335 carries the pivot 338 upon which is mounted the forward end of link 340, the rear end of this link being carried by pivot 342 which in turn is held by arm 156 which, as previously described, has its lower end mounted upon the fixed pivot 158. It will be recalled that the extension 154 of arm 156 is pivotally connected to the link 150 which moves ahead in response to an increase in assumed engine speed, and to the rear in response to a decrease in assumed engine speed.

In Fig. 1 it will be seen that an insulating disc 344 is provided, this disc being coaxial with the shaft 64 and fixedly attached to arm 326 to be rotationally positioned thereby. A pair of mutually insulated contact segments 346 and 348 are affixed to the insulating disc 344 to rotate therewith. A spring contact 350 is attached to the gear 352 by means of rivets 354 to be rotationally positioned thereby, this spring contact being arranged to engage at all times one or both of the split contact segments 346, 348, depending upon the relative rotational positions of the contact 350 and split contact segments. The gear 352 meshes with the splined rod 356 to be driven thereby, this splined rod in turn being the output shaft of the reversible follow-up motor 358. A second gear 360 meshes with the splined shaft 356 to be driven thereby, both of the gears 352 and 360 being freely mounted upon shaft 64. The gear 360 carries the pin 362 which is displaced from the axis of shaft 64 an amount equal to the displacement of the boss 364 which is integral with the left side of lever 62. Pin 362 is sufficiently long to engage the boss 364 to rotate the lever 62 counterclockwise under conditions to be described.

Reference is now made to Fig. 7 which schematically discloses the computing arrangement of the apparatus for limiting manifold pressure when the supercharger control is in the high blower position, as well as the graphical basis for said computing arrangement. The axis of shaft 64 determines the fixed pivot of the link 314, and the altitude arc 402 is drawn with its center at the axis of shaft 64 and on a radius equal to the length of arm 314. The altitude arc 402 is then marked off into convenient equal increments of length, and using a radius equal to the selected length of link 316, a plurality of altitude arcs 404 were drawn from the various points upon arc 402 previously marked off. The various points upon arc 402 are labelled in convenient numbers designating thousands of feet of altitude, and each of the arcs 404 is designated with the value of the number along arc 402 serving as its center.

Again using the axis of shaft 64 as a center, the arc 406 was described, the radius of this arc being equal to the length of link 326, the length of which equals, in the selected case but not necessarily, the length of link 314. Arc 406 was then marked off in equal increments, and each of the points upon the arc given a value from 10 to 70 in increments of 5 inches of manifold pressure. From each of the points upon arc 406 a manifold pressure arc 408 was described, and each of these arcs labelled with the same number as the point along arc 406 serving as its center. The engine speed curves 410 were then drawn in relative to the previously described curves 404 and 408 so that for any combination of assumed altitude and assumed engine speed the value of the manifold pressure upon the graph in Fig. 7 would be the same as in Fig. 6 within reasonable tolerances. Perfect conformance between the graphs of Figs. 6 and 7 is unlikely because of the necessity of producing the engine curves 410 in the form of true arcs of the same radius, the centers of each of the arcs in turn being in the form of a true arc, as will become more apparent later.

The arc 415 was then drawn with its center at the point 158 and using a radius equal to the distance between pivots 158 and 342. Arc 415 was then divided into equal parts, and the division marks labelled with the proper values of assumed engine speed. The interconnecting mechanism between the engine speed lever 130 and the arm 156 is arranged so that when lever 130 is in the 1200 R. P. M. position, 1400 R. P. M. position, etc., the pivot 342 is upon the 1200, 1400, etc. mark on arc 415. When the pivot 342 is on the 1200, 1400, etc. mark on arc 415 it is necessary that the master pivot 320 be above the correspondingly numbered engine speed curve 410. To accomplish this result, it is necessary to provide suitable mechanism interconnecting the pivot 342 and the master pivot 320 which will convert the linear movement along arc 415 for equal changes in assumed engine speed into the required non-linear movements between the engine speed arcs 410 for equal changes in assumed engine speed. This interconnecting mechanism takes the form of the link 340, bell crank 335 and link 328, together with their associated pivots. This portion of the apparatus was designed as follows:

As previously explained, the engine speed curves 410 are arcs of the same radius, this radius being equal to the length of link 328, and the center of each of these arcs in turn define the arc 412 which has its center at the pivot 336. Each of the centers of the arcs 410 is marked on arc 412 and correspondingly numbered. The points thereon, as shown, are non-linearly spaced. By providing bell crank arm 334 pivoted at 336 and its arm 332 connected to link 328 at pivot 330, and by interconnecting arm 156 with link 340, the linear motion of arm 156 which takes place with changes in assumed engine speed is converted into the proper non-linear motion of pivot 330 along arc 412 and of the master pivot 320 relative to the engine speed curves 410.

Accordingly, when the pivot 342 is upon the 1200, 1400, etc. R. P. M. mark on arc 415, pivot 338 will be above the corresponding valued points of arc 414 and pivot 330 will be above the correspondingly valued points along arc 412. Accordingly, the position of pivot 320 relative to the engine speed curves 410 will be according to the position of pivot 342 along arc 415, the position of which depends upon the setting of the engine speed lever 130.

The positions of the parts of the maximum available manifold pressure computer for the high blower supercharger condition when the engine speed lever 130 is in the 2000 R. P. M. position are shown in Fig. 7.

It will be recalled that the gear 266 in Fig. 1 is always rotationally positioned in accordance with the instant assumed altitude, this gear being rotated counterclockwise with an increase in assumed altitude. Inasmuch as this gear is pinned to the shaft 64, the shaft 64 is always rotationally positioned in accordance with the instant assumed altitude. Arm 314 is affixed to shaft 64 to rotate therewith, and consequently this arm will also always be positioned in accordance with the factor of instant assumed altitude. Accordingly, the link 316 which interconnects the upper end of arm 314 with the master pivot 320 will always position the master pivot 320 relative to the altitude curves 404 in accordance with the instant assumed altitude.

In the case shown in Fig. 7, when assumed altitude is 20,000 feet, the arm 314, pivot 318, link 316 and pivot 320 will be positioned as shown.

Consequently, the master pivot 320 is always positioned relative to the engine speed curves 410 and the altitude curves 404 in accordance with the instant assumed engine speed and altitude. Accordingly, the master pivot 320 will at all times be properly positioned relative to the manifold pressure curves 408 for the existing assumed engine speed and altitude, and by means of link 322 which interconnects the master pivot 320 with the arm 326, the arm 328 will always be positioned about the axis of shaft 64 in a position corresponding to the maximum available manifold pressure for the existing assumed altitude and engine speed. The position of the split contact segments 346 and 348 is changed by any change in the position of the maximum manifold pressure available arm 326, and for present purposes it is merely stated that the motor 358 always functions as a result of any rotation of the contact segments to rotate the splined shaft 356 and gear 352 through the same angle and in the same direction as the rotation of the contact segments to bring the contact 350 to the same rotational position as the contact segments 346 and 348, at which instant motor 358 stops. While motor 358 is so returning the contact leaf 350, gear 360 is rotated in the same direction and through the same angle as the contact segments. Accordingly, the pin 362 carried by gear 360 is at all time positioned in accordance with the position of the maximum available manifold pressure arm 326, the position of which is a measure of the instant assumed maximum available manifold pressure. The electrical circuit interconnecting the contact segments 346, 348 and motor 358 will be hereinafter disclosed.

The rotational position of lever 62 in Fig. 1 cannot at any time be farther clockwise than the position of pin 362 because of the engagement of boss 364 by pin 362. If the student in the trainer pushes the throttle lever 10 sufficiently far ahead to normally produce a higher instant assumed manifold pressure than it would be possible for the engine being simulated to produce with the existing R. P. M. setting and altitude, the stop 364 on lever 62 will engage the pin 362, and further clockwise rotation of the lever 62 will be prevented. The collar 58 pressing against the compression spring 56 will compress the spring, but the link 68 attached to the bottom of lever 62 will not move ahead once the stop 364 has engaged pin 362. Accordingly, although the link 68 normally is moved ahead in response to a forward movement of the throttle lever 10—the position of this link being a measure of the instant assumed manifold pressure, which factor is primarily determined by the throttle lever setting—when the instant assumed altitude and engine speed are such that the engine cannot produce the manifold pressure for which the throttle lever is set, the maximum available manifold pressure computer 319 limits the forward movement of link 68, thereby limiting the instant assumed manifold pressure. Consequently, the indication given by the manifold pressure indicator 124 in Fig. 3 will not exceed the instant available maximum manifold pressure, and the manifold pressure input to the brake horsepower computer in Fig. 2 will not exceed the same factor.

Also, in the instance where during the operation of the apparatus of this invention the factors of assumed altitude and engine speed are such that the manifold pressure for which the throttle lever is set may be developed when the supercharger is in the high blower position, and subsequently the assumed engine speed is decreased and/or assumed altitude is decreased beyond the limits within which the engine being simulated could maintain the manifold pressure for which the throttle lever is set, the maximum available manifold pressure computer 310 will at the proper time and to the proper extent operate the motor 358 to rotate gear 360 counterclockwise so that pin 362 engages stop 364 to rotate lever 62 counterclockwise and move link 68 to the rear by the proper amount.

Consequently, by the provision of the computer disclosed in Fig. 1 and described above, the functioning of an engine of the type being simulated wherein the instant available manifold pressure is primarily determined by the setting of the throttle lever but is limited by the prevailing engine speed and altitude is accurately simulated, for the case when the supercharger of the engine is in the "high blower" position.

An arrangement quite similar to that disclosed in connection with the assumed high blower supercharger position is also provided for simulating the limiting effect of engine speed and altitude when the supercharger is assumed to be in the low blower position. Such means will now be described.

Reference is now made to Fig. 8 which is a rectilinear graph showing the maximum available manifold pressure for various conditions of altitude and engine speed of the engine being simulated when the supercharger is in the low blower position, and to Fig. 9 which is a curvilinear graph based on the graph of Fig. 8. The graphs in Figs. 8 and 9 show somewhat different values for the maximum available manifold pressure from the values shown in Figs. 6 and 7 for corresponding values of altitude and engine speed, the differences being attributable to the supercharger effects upon the manifold pressure produced. For example, in Fig. 6, which shows engine performance when the supercharger is in the high blower position, when altitude is 22,000 feet and the engine speed is 2000 R. P. M., the manifold pressure produced is 25 inches, while in Fig. 8, which shows engine performance when the supercharger is in the low blower position, when assumed altitude is 22,000 feet and engine speed 2000 R. P. M., the manifold pressure is approximately 19 inches. In both Figs. 7 and 9 it will be seen that the assumed altitude, in the cases illustrated, is 20,000 feet, and that the assumed engine speed is 2000 R. P. M. In Fig. 7, which illustrates the case when the supercharger is assumed to be in the high blower position, the assumed manifold pressure is about 27 inches. However, in Fig. 9 which illustrates the case where the supercharger is in the low blower position, the assumed manifold pressure produced is about 20.5 inches.

Inasmuch as for any combination of altitude and engine speed in the case of the engine being simulated, the maximum available manifold pressure varies depending upon whether the supercharger is in the high blower or low blower position, it becomes clear that in order to accurately simulate the performance of the engine in question it is necessary to provide a pair of computing arrangements to limit motion of link 68 in Fig. 1 depending upon whether the student has the simulated supercharger control in the high blower or low blower position.

Referring now to Figs. 1 and 9, it will be seen that the maximum available manifold pressure computer for the low blower condition is designated generally by 312 and includes the arm 420 affixed upon shaft 64 to rotate therewith. The forward end of link 422 is pivotally connected to the upper end of arm 420 by pivot 421, and the rear end of this link is carried by the master pivot 424. The upper end of link 426 is also carried by pivot 424, the lower end of this link being connected to the outer end of arm 428 by pivot 430. The forward end of arm 428 is freely mounted upon shaft 64. The upper end of arm 156 is carried by pivot 432, as is the upper end of link 434, the lower end of which is carried by pivot 436. Pivot 436 connects the lower end of arm 434 with the lower end of arm 438, the upper end of which is held by the fixed pivot 440 which takes the form of a stud rotatably held in the boss 442 which is affixed to the casting 66. Lastly, the link 444 is provided, this link having its lower end carried by pivot 446 which in turn is carried by arm 438, the upper end of link 444 being carried by the master pivot 424.

Referring to Fig. 10, it will be seen that the insulating disc 500 is affixed to arm 428 by means of rivets 502, and that this insulating disc carries the two mutually insulated contact segments 504 and 506. A spring contact 508 is pinned to gear 510 by rivets 512, gear 510 being freely mounted on shaft 64 and meshed with splined rod 356 of Fig. 1 to be driven thereby. The contact arrangement just described is esentially the same as that previously disclosed in connection with the high blower maximum available manifold pressure computer 310.

Referring now to Fig. 9, the basic altitude arc 450 is divided into convenient increments of altitude, and the altitude curves 452 are drawn therefrom in the same manner as described in connection with Fig. 7, employing a radius equal to the length of link 422. Also the basic manifold pressure arc 454 is divided into convenient increments of manifold pressure, and the manifold pressure curves 456 are drawn therefrom in the manner previously described, employing a radius equal to the length of link 426. The R. P. M. curves 458 are plotted in from the information shown in Fig. 8, as previously described, and the center of each of these curves is plotted and numbered, and the arc 460 drawn therethrough, the center of this arc being the fixed pivot 440. The lower end of link 444 is attached to arm 438 at a distance from the fixed pivot 440 equal to the radius of the arc 460 by pivot 461, the length of link 444 being equal to the radius of the engine speed curves 458. The arc 464 is drawn, using a radius equal to the distance from pivot 158 to the pivot 432, and this arc is divided into increments of equal length for equal changes in the factor of assumed engine speed. In order to convert the linear movement of pivot 432 along arc 464 with equal changes in assumed engine speed into the required non-linear movement of arm 438 along arc 460 and of master pivot 424 relative to the non-linearly spaced engine speed curves 458, the link 438 is extended beyond pivot 461, and the lower end of this link used to describe the arc 462 concentric with arc 460. Arc 462 is divided into non-linear increments labelled with values corresponding to those on arc 460 for given positions of the radius link 438. The link 434 connects the pivot 432 and pivot 436 at the outer end of link 438 to convert the linear motion of pivot 432 into a non-linear motion of pivot 436 along arc 462, of pivot 461 along arc 460, and of the master pivot 424 relative to the engine speed curves 456.

The electrical circuit interconnecting contact segments 504, 506 and motor 358 will be hereinafter disclosed.

In view of the preceding disclosure of the available manifold pressure computer disclosed in Figs. 1 and 9, it will be appreciated that the arm 156 is always positioned about the fixed pivot 158 in accordance with the instant assumed engine speed, and by means of link 434 the arm 438 is always correctly positioned about pivot 440 and along arc 460 in accordance with the same factor. By means of link 444 the master pivot 424 is always properly positioned relative to the engine speed curves 458 for the instant assumed engine speed.

Inasmuch as shaft 64 is always rotationally positioned in accordance with the instant assumed altitude, the arm 420 will be similarly positioned, and by means of link 422 the master pivot 424 is always properly positioned relative to the altitude curves 452 in accordance with the factor of instant assumed altitude. Accordingly, by means of link 426, the pivot 430 is always positioned along arm 454 and the arm 428 is always properly positioned about the axis of shaft 64 in accordance with the instant assumed maximum available manifold pressure for the prevailing assumed altitude and engine speed. The split contact segments will always be positioned in accordance with the instant assumed maximum available manifold pressure and any displacement of the contact 508 from engagement with both the split contact segments 504 and 506 will energize motor 358 to drive the splined shaft 356 and gear 510 to bring the contact 508 back into engagement with both of the split contact segments, at which instant the motor will stop. At the same time the rotation of the splined shaft 356 will position the gear 360 and pin 362 which controls the clockwise rotation of lever 62. Consequently, by means of the disclosed follow-up system, the gear 360 and pin 362 are positioned in accordance with the position of arm 428, which arm is positioned according to the maximum available manifold pressure for the low blower supercharger condition. Accordingly, when the supercharger control is in the low blower position, if the throttle lever 10 is positioned ahead to produce an assumed manifold pressure greater than the maximum available manifold pressure for the assumed altitude and engine speed, the computer 312 by positioning pin 362 prevents the link 68 from being positioned farther ahead than the position which it should occupy for the value of the instant assumed maximum manifold pressure available. Consequently, a proper assumed manifold pressure is indicated by the manifold pressure indicator 124 in Fig. 3 and is introduced into the brake horsepower computer of Fig. 2.

Reference is now made to Fig. 11 which discloses the electrical system which is associated with the maximum available manifold pressure computing apparatus disclosed in Fig. 1. In Fig. 11 the contact segments 504, 506 and the spring contact 508 associated with the low blower maximum available manifold pressure computer 312 are shown. Spring contact 508 will be seen to be grounded. The spring contact 526 is arranged to bear against the periphery of segment 504, and this contact is connected through conductor 522 to the contact point 524. When the movable contact 526 is in engagement with contact 524, the contact 524 is conected by conductor 528 to contact 530. When the movable contact 532 is in engagement with contact 530, contact 530 is connected through conductor 534 with the lower shading coil 536 of the previously mentioned shaded pole reversible follow-up motor 358. The contact segment 506 is engaged at all times by the contact member 538 which is connected through conductor 540 with the contact 542, and when the movable contact 544 is engaged with the contact 542, contact 542 is connected through conductor 546 with the fixed contact 548. When the movable contact 550 engages the fixed contact 548, contact 548 is connected through conductor 554 with the upper shading coil 556 of motor 358. The lower end of shading coil 556 and the upper end of shading coil 536 are grounded through conductor 558 and the conventional adjustable resistor 560.

The contact segments 346, 348 and contact 350 which are associated with the high blower maximum available manifold pressure computer 310 are also shown in Fig. 11. Contact 350 will be seen to be grounded. The contact 562 is arranged to engage the segment 346 at all times, and 562 is connected through conductor 564 with the fixed contact 566, and when the movable contact 526 engages fixed contact 566, fixed contact 566 is connected through conductor 528 with the fixed contact 530. As previously stated, when the movable contact 532 engages fixed contact 530, contact 530 is connected through conductor 534 with the lower shading coil 536. The contact 570 is arranged to engage the contact segment 348 at all times, and contact 570 is connected through conductor 572 with the fixed contact 574. When the movable contact 544 engages the fixed contact 574, contact 574 is connected through conductor 546 with the fixed contact 548. When the movable contact 550 engages the fixed contact 548, as previously explained, fixed contact 548 is connected through conductor 554 to the upper shading coil 556.

The field coil of motor 358 is designated 576, and it will be seen that by means of conductors 578 and 580 a 110 volt potential is impressed across this field coil at all times. In Fig. 11 it will also be seen that the conductor 582 connects to one side of the 110 volt potential, and that this conductor is in the circuit including the supercharger control 584 which is schematically shown in Fig. 11 as being a switch. This switch, which is manually operated by the student receiving instruction by the use of the trainer of which the apparatus of this invention forms a part, connects the conductor 582 with the conductor 586 and relay 588. Relay 588 is connected, on its other side, by the conductors 590 and 578 with the other side of the 110 volt line.

The master relay 592 is energized whenever it is assumed that the engine in the trainer is running, as disclosed in the previously mentioned patent application Serial Number 634,492, now Patent Number 2,510,500, issued June 6, 1950, so that the movable contact 594 is normally disengaged from the fixed contact 596, opening the circuit including ground, conductor 598, contacts 594 and 596, conductor 600, the power failure relay 602, conductor 604 and conductor 582 which connects with the hot side of the 110 volt source. Accordingly, the power failure relay 602 is normally de-energized.

Assuming that the supercharger control 584 is in the high blower position, in which position switch 584 is closed, the relay 588 will be energized, resulting in an engagement between the movable contact 544 and the fixed contact 574, and in an engagement between the movable contact 526 and fixed contact 566. No engagement will be made between the two pairs of contacts 542, 544 and 524, 526. The power failure relay 602, being normally de-energized will permit engagement between the contacts 548 and 550, as well as between the contacts 530 and 532. Accordingly, the contact 562 which engages the contact segment 346 will be connected through the electrical elements 564, 566, 526, 528, 530, 532, and 534 with the lower shading coil 536, and the contact 570 which engages the contact segment 348 will be connected through electrical element 572, 574, 544, 546, 548, 550, and 554 with the upper shading coil 556.

When the grounded contact 350 engages both of the contact segments 346 and 348, through the just described electrical connections both coils 536 and 556 of motor 358 will be grounded at both of their ends, and consequently motor 358 will not run. However, whenever the factor of maximum available manifold pressure as computed by the computer 310 of Fig. 1 is decreased, as previously explained the arm 326 will be rotated counterclockwise resulting in a similar rotation of the contact segments 346 and 348. Consequently, the contact 350 will be momentarily disengaged from the contact segment 346, and the lower shading coil 536 will no longer be grounded at both ends. Motor 358 will immediately be energized to rotate the output shaft 356 in the clockwise direction, resulting in a counterclockwise rotation of the gear 352 until the contact 350 is rotated through the same angle as the contact segments 346 and 348 were rotated in response to the decrease in assumed maximum available manifold pressure. When this rotation has taken place, the contact 350 will again engage both of the contact segments 346 and 348, at which instant both of the shading coils 536 and 556 will be grounded, and motor 358 will stop. At the same time that gear 352 is being rotated counterclockwise by the splined shaft 356, the gear 360 is similarly rotated, carrying pin 362 counterclockwise through the same angle as the contact 350, thereby limiting the clockwise rotation of lever 62 and the forward movement of the link 68, the position of this last link being the measure of the instant assumed manifold pressure.

On the other hand, whenever the maximum available manifold pressure computer 310 of Fig. 1 is operated to rotate the arm 326 clockwise in response to an increase in the maximum available manifold pressure, the contact segment 350 will become disengaged from the contact segment 348, and the upper shading coil 556 of motor 358 will no longer be grounded. Accordingly, motor 358 will be instantly energized to rotate in the opposite direction from that just described, resulting in a counterclockwise rotation of the output shaft 356 and in a clockwise rotation of the gear 352. These movements will continue until the gear 352 and contact 350 have been rotated through the same angle as the contact segments 346 and 348 were rotated in response to the increase in assumed maximum available manifold pressure, at which time the contact 350 will again engage both of the contact segments 346 and 348 and motor 358 will stop. The clockwise rotation of gear 352 is accompanied by a similar rotation of gear 360 and pin 362, permitting a greater clockwise rotation of lever 62 and a further movement ahead of the link 68. Consequently, a greater assumed manifold pressure may be obtained.

When the supercharger control 584 is positioned by the student in the low blower position, the switch 584 is open and the relay 588 is de-energized. Consequently, no contact will be made between the contacts 544 and 574, nor between the contacts 566 and 526. Such being the case, the contact segments 346 and 348 together with the contact 350 are no longer operable to regulate the operation of the follow-up motor 358, but by virtue of the fact that the contacts 542 and 544, on the one hand, and the contacts 524 and 526, on the other hand, will then be engaged, it will be appreciated that the contacts 520 and 538 which bear against the contact segments 504 and 506 are connected to the shading coils 536 and 556. Accordingly, when the movable contact 508 engages both of the contact segments 504 and 506, both of the shading coils 536 and 556 will be grounded, and motor 358 will be de-energized. When the low blower maximum available manifold pressure computer 312 is operated to rotate the contact segments 504 and 506 in one direction or another, depending upon whether the assumed maximum available manifold pressure is increased or decreased, the follow-up motor 358 will be energized to rotate the splined shaft 356 in the proper direction, to rotate the gear 510 and contact 508 in the same direction and through the same angle as the contact segments 504 and 506 are rotated, to bring the contact 508 back into engagement with both of the contact segments 504 and 506 to de-energize motor 358. The rotation of splined shaft 356 of course properly positions the gear 360 and pin 362 to limit the position of link 68, as previously explained.

Accordingly, the position of the supercharger control 584 determines which set of contact segments controls the operation of motor 358, thereby regulating the position of pin 362 according to whether the engine is assumed to be operating upon the high blower or low blower. As previously explained, the maximum available manifold pressure of the engine being simulated for identical altitudes and engine speeds is different when the engine is operating in the high blower and low blower conditions.

The engine being simulated cannot produce a manifold pressure higher than 49.5 inches when it is operating upon the high blower, nor can it produce a manifold pressure greater than 53.5 inches when operating in the low blower condition. The following apparatus limits the assumed manifold pressure according to whether the supercharger control 584 is in the high blower or low blower condition.

Reference is made to Fig. 12 which shows the gear 360, also seen in Fig. 1, and the pin 362 carried thereby. Affixed to the left side of the gear to be carried thereby is the contact 690 which is arranged to engage the roller 692 of micro-switch 694 to close the same when gear 360 is rotated into the 49.5 inch assumed manifold pressure position.

Referring to Fig. 11, the switch 694 is shown connected by conductor 696 to the conductor 572 which connects with the upper coil 556 of the motor 358 when the supercharger control 584 is in the high blower position. The other side of switch 694 is grounded. Accordingly, when the supercharger control 584 is in the high blower position and assumed manifold pressure reaches 49.5 inches, switch 694 is closed, and both sides of coil 556 are grounded. At the same time both sides of coil 536 will be grounded, and so motor 358 will be rendered inoperative to further increase the assumed manifold pressure. Consequently, pin 362 cannot be rotated clockwise beyond the 49.5 inch assumed manifold pressure position when the supercharger control is in the high blower position, and the forward movement of link 68 is accordingly limited.

An assumed manifold pressure higher than 53.5 inches cannot be obtained when the supercharger control is in the lower blower position because the apparatus is so designed that the link 63 cannot move ahead of the 53.5 inch assumed manifold pressure position under any circumstances.

In the case of the engine being simulated, in the event of an engine failure the manifold pressure returns to approximately 10 inches. The following apparatus simulates this characteristic of the engine being simulated.

Reference is made to Fig. 3 where the switch 606 having the contact arm 608 is shown. This switch is shown in Fig. 11 and it will be seen that the fixed contact 607 thereof is grounded, while the contact arm 608 is connected through conductor 610 with the fixed contact 614. In the event of an assumed engine failure, the master relay 592 becomes de-energized, closing the contacts 594 and 596, and energizing the power failure relay 602. Contacts 530 and 532 become disengaged, and the circuit including the lower coil 536 of motor 358 is opened. At the same time contacts 548 and 550 are opened, and contacts 550 and 614 become engaged, completing the circuit between the upper shading coil 556 and ground through the electrical elements 554, 550, 614, 610, 608 and 607. Motor 358 is energized to run in the direction of a decrease in assumed manifold pressure until the bell crank arm 70 of Fig. 3 reaches the 10 inch assumed manifold pressure position, at which instant arm 70 engages contact 608, and opens switch 606. Motor 358 stops.

Re-energization of the relay as a result of an assumed restarting of the engine will result in a deenergization of the failure relay 602, and the contact plates 346, 348 and 504, 506 will be rendered operative to control the motor 358.

In view of the preceding disclosure it will be appreciated that the apparatus of this invention closely simulates the functioning of an aircraft engine equipped with a manifold pressure regulator. Numerous changes may be made in the disclosed preferred embodiment of this invention without departing from the substance thereof, as covered by the following claims.

We claim:

1. In a grounded aviation trainer, the combination of a first lever simulating the throttle control lever of a real plane, an instrument simulating the manifold pressure gauge of a real plane connected to said lever to normally give an indication dependent solely upon the position of said lever, an altitude unit in said trainer having an output corresponding to the assumed altitude of said trainer, a second lever in said trainer simulating the engine speed control lever of a real plane, computing means connected to said altitude unit and to said second lever for computing the instant assumed maximum available manifold pressure according to the instant assumed altitude and instant setting of said second lever, and means for limiting the reading of said instrument according to the output of said maximum available manifold pressure computer when said first lever is positioned to normally produce an assumed manifold pressure greater than the computed assumed maximum available manifold pressure.

2. In a grounded aviation trainer, the combination of a first lever simulating the throttle control lever of a real plane, an instrument simulating the manifold pressure gauge of a real plane connected to said lever to normally give an indication dependent solely upon the position of said lever, an altitude unit in said trainer having an output corresponding to the assumed altitude of said trainer, a second lever in said trainer simulating the engine speed control lever of a real plane, a first computer connected to said altitude unit and to said second lever for computing the instant assumed maximum available manifold pressure according to the instant assumed altitude and instant setting of said second lever when the supercharger is assumed to be operating on high blower, a second computer connected to said altitude unit and to said second lever for computing the instant assumed maximum available manifold pressure according to the instant assumed altitude and instant setting of said second lever when the supercharger is assumed to be operating on low blower, a manual control simulating the supercharger control of a real plane for rendering operative one or the other of said maximum available manifold pressure computers, and means for limiting the reading of said instrument according to the output of the operative one of said maximum available manifold pressure computers selected by the position of said supercharger simulating control when said first lever is positioned to normally produce an assumed manifold pressure greater than the assumed maximum available manifold pressure computed by the selected computer.

3. In a grounded aviation trainer, the combination of a first lever simulating the throttle control lever of a real plane, an instrument simulating the manifold pressure gauge of a real plane, means including a movable member normally positioned according to the position of said lever interconnecting said lever and instrument for causing said instrument to give an indication dependent upon the position of said movable member, an altitude unit in said trainer having an output corresponding to the assumed altitude of said trainer, a second lever in said trainer simulating the engine speed control lever of a real plane, mechanical computing means connected to said altitude unit and to said second lever for computing the instant assumed maximum available manifold pressure according to the instant assumed altitude and instant setting of said second lever, and output means connected to said mechanical computer for limiting the movement of said movable member when said first lever is positioned to normally position said movable member to cause said instrument to indicate a higher assumed manifold pressure than the maximum available manifold pressure computed by said computer.

4. In a grounded aviation trainer, the combination of a first lever simulating the throttle control lever of a real plane, an instrument simulating the manifold pressure gauge of a real plane connected to said lever to normally give an indication dependent solely upon the position of said lever, an altitude unit in said trainer having an output corresponding to the assumed altitude of said trainer, a second lever in said trainer simulating the engine speed control lever of a real plane, computing means for computing the instant assumed maximum available manifold pressure according to the instant assumed altitude and instant setting of said second lever, said computer comprising a fixed pivot, a first pair of linkages each having a first end carried by said fixed pivot, a second pair of linkages each having a first end pivoted to the second end of a different one of each of said first pair of linkages, the second end of each of said second pair of linkages being pivotally held together by a master pivot, means interconnecting one of said first pair of arms and said altitude unit for positioning said arm about said fixed pivot according to the instant assumed altitude, means interconnecting said master pivot and said second lever for positioning said master pivot according to the instant position of said lever, and means operative in response to the position of the other of said first pair of arms for limiting the reading of said instrument according to the position of said arm.

5. In a grounded aviation trainer, the combination of a first lever simulating the throttle control lever of a real plane, an instrument simulating the manifold pressure gauge of a real plane connected to said lever to normally give an indication dependent solely upon the position of said lever, an altitude unit in said trainer having an output corresponding to the assumed altitude of said trainer, a second lever in said trainer simulating the engine speed control lever of a real plane, a first computer for computing the instant assumed maximum available manifold pressure according to the instant assumed altitude and instant setting of said second lever when the supercharger is assumed to be operating on high blower, a second computer for computing the instant assumed maximum available manifold pressure according to the instant assumed altitude and instant setting of said second lever when the supercharger is assumed to be operating on low blower, each of said computers comprising a fixed pivot, a first pair of linkages each having a first end carried by said fixed pivot, a second pair of linkages each having a first end pivoted to the second end of a different one of each of said first pair of linkages, the second end of each of said second pair of linkages being pivotally held together by a master pivot, means interconnecting one of said first pair of arms of each computer and said altitude unit for positioning each of said arms about its fixed pivot according to the instant assumed altitude, means interconnecting each of said master pivots and said second lever for positioning each of said master pivots according to the instant position of said lever, a manual control simulating the supercharger control of a real plane for rendering operative one or the other of said maximum available manifold pressure computers, and means operated by the position of the other of the first pair of arms of the operative computer and coacting with the connection between said first lever and said instrument for limiting the indication of said instrument to a reading not greater than the instant assumed maximum available manifold pressure as computed by the selected computer.

6. A maximum available manifold pressure computer for use in grounded aviation trainers comprising a fixed pivot, a first pair of linkages each having a first end carried by said fixed pivot, a second pair of linkages each having a first end pivoted to the second end of a different one of each of said first pair of linkages, the second end of each of said second pair of linkages being pivotally held together by a master pivot, an altitude unit in said trainer having an output corresponding to the instant assumed altitude of said trainer, a lever in said trainer simulating the engine speed control lever of a real plane, means interconnecting one of said first pair of arms and said altitude unit for positioning said arm about said fixed pivot according to the instant assumed altitude, and means interconnecting said master pivot and said lever for positioning said master pivot according to the instant position of said lever, whereby the other of said first pair of arms is positioned about said fixed pivot according to the instant assumed maximum available manifold pressure.

7. A brake horsepower computer for use in grounded aviation trainers comprising, in combination, a first fixed pivot, a first arm carried by said pivot, a first link having one end pivotally connected to the outer end of said arm, a second link extending generally parallel to the first arm and on the same side of said link as said first arm and having one end pivoted to the other end of said first link, a second fixed pivot, a second arm carried by said pivot and extending generally parallel to said first link, a third fixed pivot positioned on the same side of said first link as said first and second fixed pivots, a third arm carried by said third fixed pivot and extending generally toward said first link, and a third link having one end pivotally attached to the outer end of said third arm and its other end pivotally attached to said pivot between said first and second links, a first lever in said trainer simulating the throttle control lever of a real plane, means interconnecting said first lever and third arm for positioning said third arm, said third link and said pivot between said first and second links according to the position of said first lever, a second lever in said trainer simulating the engine speed control lever of a real plane, means interconnecting said second lever and said second arm for positioning said second arm, said second link and said pivot between said first and second links according to the position of said second lever, whereupon said pivot interconnecting said first and second links, said first link and said first arm are positioned according to the instant assumed brake horsepower, and output means positioned according to the position of said first arm about said first fixed pivot.

KENNETH H. CHAPPLE.
RAYMOND E. KITTREDGE.

REFERENCES CITED

The following references are of record in the file of this patent:

UNITED STATES PATENTS

| Number | Name | Date |
|---|---|---|
| 2,093,254 | Spitzglass | Sept. 14, 1937 |
| 2,340,350 | Svoboda | Feb. 1, 1944 |
| 2,394,180 | Imm | Feb. 5, 1946 |
| 2,409,238 | Barber | Oct. 15, 1946 |
| 2,439,168 | Kail | Apr. 6, 1948 |
| 2,442,205 | Kail | Apr. 16, 1948 |
| 2,450,239 | Kail | May 25, 1948 |

FOREIGN PATENTS

| Number | Country | Date |
|---|---|---|
| 113,136 | Great Britain | Feb. 7, 1918 |
| 114,893 | Switzerland | May 16, 1931 |